US008446487B2

(12) United States Patent
Shimizu

(10) Patent No.: US 8,446,487 B2
(45) Date of Patent: May 21, 2013

(54) WHITE BALANCE ADJUSTMENT APPARATUS, WHITE BALANCE ADJUSTMENT METHOD, RECORDING MEDIUM STORING WHITE BALANCE ADJUSTMENT PROGRAM AND IMAGING APPARATUS

(75) Inventor: Saori Shimizu, Koganei (JP)

(73) Assignee: Olympus Corporation, Tokyo (JP)

( * ) Notice: Subject to any disclaimer, the term of this patent is extended or adjusted under 35 U.S.C. 154(b) by 388 days.

(21) Appl. No.: 12/624,874

(22) Filed: Nov. 24, 2009

(65) Prior Publication Data

US 2010/0225780 A1 Sep. 9, 2010

(30) Foreign Application Priority Data

Nov. 28, 2008 (JP) ................................. 2008-304302

(51) Int. Cl.
*H04N 9/73* (2006.01)
(52) U.S. Cl.
USPC ........................................ 348/223.1; 382/167
(58) Field of Classification Search
USPC ....... 348/207.99, 223.1–225.1, 366; 382/162, 382/167, 254; 358/516; 396/213
See application file for complete search history.

(56) References Cited

U.S. PATENT DOCUMENTS

| 5,438,363 A * | 8/1995 | Ejima et al. ................. 348/223.1 |
| 5,550,587 A * | 8/1996 | Miyadera .................... 348/223.1 |
| 5,617,141 A * | 4/1997 | Nishimura et al. ........... 348/366 |
| 6,958,773 B1 * | 10/2005 | Sato ............................ 348/223.1 |
| 2003/0001958 A1 * | 1/2003 | Hoshuyama ............... 348/223.1 |
| 2003/0160876 A1 * | 8/2003 | Miyao et al. ............... 348/223.1 |
| 2005/0008243 A1 * | 1/2005 | Fujino .......................... 382/254 |
| 2006/0170789 A1 * | 8/2006 | Takahashi et al. ......... 348/223.1 |
| 2006/0284991 A1 * | 12/2006 | Ikeda .......................... 348/223.1 |
| 2007/0154203 A1 * | 7/2007 | Takahashi et al. ............ 396/213 |
| 2008/0101690 A1 * | 5/2008 | Hsu et al. ....................... 382/162 |

FOREIGN PATENT DOCUMENTS

| JP | 2000-224608 A | 8/2000 |
| JP | 2001-028762 A | 1/2001 |
| JP | 2008-52428 A | 3/2008 |
| JP | 2008-211427 A | 9/2008 |

OTHER PUBLICATIONS

Japanese Office Action dated Mar. 5, 2013 (and English translation thereof) in counterpart Japanese Application No. 2008-304302.

* cited by examiner

*Primary Examiner* — Nelson D. Hernández Hernández
*Assistant Examiner* — Dennis Hogue
(74) *Attorney, Agent, or Firm* — Holtz, Holtz, Goodman & Chick, P.C.

(57) ABSTRACT

A white balance adjustment apparatus comprises an area estimation unit that estimates at least one light, source color estimation area for estimating a light source color in a photographed image, a distance calculation unit that calculates a distance of the light source color estimation area in a depth direction of the photographed image as the distance of the light source color estimation area, a chromaticity calculation unit that calculates a chromaticity of the light source color estimation area, and a white balance adjustment value calculation unit that calculates a white balance adjustment value on the basis of the distance of the light source color estimation area and the chromaticity of the light source color estimation area.

22 Claims, 18 Drawing Sheets

| i | j | DISTANCE (m) |
|---|---|---|
| 1 | 1 | 5 |
| 1 | 2 | 4.8 |
| 1 | 3 | 5 |
| 1 | 4 | 5.1 |
| 1 | 5 | 5 |
| 1 | 6 | 2 |
| 1 | 7 | 1.8 |
| 1 | 8 | 2 |
| ⋮ | ⋮ | ⋮ |

WHITE BALANCE ADJUSTMENT APPARATUS, WHITE BALANCE ADJUSTMENT METHOD, RECORDING MEDIUM STORING WHITE BALANCE ADJUSTMENT PROGRAM AND IMAGING APPARATUS

FIELD OF THE INVENTION

This invention relates to a technique for calculating a white balance adjustment value used to adjust a white balance of a photographed image.

BACKGROUND OF THE INVENTION

In a well known conventional technique (see JP2000-224608A), an image obtained by photographing an object is divided into a plurality of areas, color information is obtained from each area, a light source type is determined on the basis of the color information obtained from each area and a color distribution corresponding to a light source, and white balance adjustment is performed in accordance with the light source type.

In another well known technique (see JP2001-28762A), an image area having a small object distance is extracted from a photographed image on the basis of information relating to a distance from a camera to the object, and a controlled variable for use in white balance adjustment is calculated on the basis of an imaging signal relating to the extracted image area.

SUMMARY OF THE INVENTION

A white balance adjustment apparatus of an aspect of the present invention comprises an area estimation unit that estimates at least one light source color estimation area for estimating a light source color in a photographed image, a distance calculation unit that calculates a distance of the light source color estimation area in a depth direction of the photographed image as the distance of the light source color estimation area, a chromaticity calculation unit that calculates a chromaticity of the light source color estimation area, and a white balance adjustment value calculation unit that calculates a white balance adjustment value on the basis of the distance of the light source color estimation area and the chromaticity of the light source color estimation area.

A white balance adjustment method of another aspect of the present invention comprises a step of estimating at least one light source color estimation area for estimating a light source color in a photographed image, a step of calculating a distance of the light source color estimation area in a depth direction of the photographed image as the distance of the light source color estimation area, a step of calculating a chromaticity of the light source color estimation area, and a step of calculating a white balance adjustment value on the basis of the distance of the light source color estimation area and the chromaticity of the light source color estimation area.

A storage medium of yet another aspect of the present invention stores a white balance adjustment program. The white balance adjustment program causes a computer to execute a step of estimating at least one light source color estimation area for estimating a light source color in a photographed image, a step of calculating a distance of the light source color estimation area in a depth direction of the photographed image as the distance of the light source color estimation area, a step of calculating a chromaticity of the light source color estimation area, and a step of calculating a white balance adjustment value on the basis of the distance of the light source color estimation area and the chromaticity of the light source color estimation area.

BRIEF DESCRIPTION OF THE DRAWINGS

FIG. 11 is a view showing an example of distance information for each of the plurality of divided areas (i, j).

DESCRIPTION OF THE PREFERRED EMBODIMENTS

First Embodiment

Figure 1:
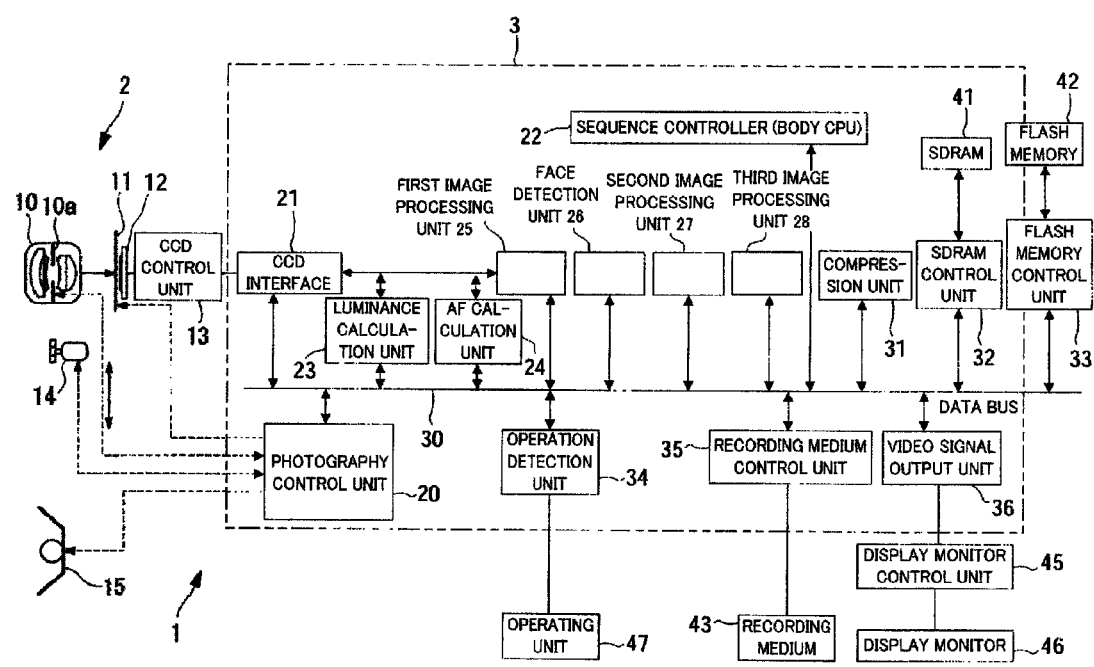
FIG. 1 is a block diagram showing the schematic constitution of an imaging apparatus to which a white balance adjustment apparatus according to a first embodiment of this invention is applied.

FIG. 1 is a block diagram showing the schematic constitution of an imaging apparatus to which a white balance adjustment apparatus according to a first embodiment of this invention is applied. An imaging apparatus 1 is a digital camera, for example, which includes an imaging unit 2 and an image processing device 3. The white balance adjustment apparatus corresponds to a second image processing unit 27 provided in the interior of the image processing device 3.

The imaging unit 2 includes a lens 10, a shutter 11, a CCD 12, a CCD control unit 13, a lens driving unit 14, and a stroboscope 15. Alternatively, the white balance adjustment apparatus according to this embodiment may be installed in various electronic devices capable of white balance adjustment, rather than a digital camera.

An imaging lens used for focus adjustment and focal length adjustment, and an aperture stop 10*a* for aperture adjustment are disposed in the lens 10. The aperture stop 10*a* adjusts a brightness and a depth of light entering an imaging area on the basis of a control command from a photography control unit 20. However, in a moderately priced imaging apparatus in which the need for depth adjustment is small, an ND filter that adjusts a light amount, for example, may be provided instead of the aperture stop 10*a* for the purpose of brightness adjustment.

The lens 10 is driven by activating the lens driving unit 14 through control executed by the photography control unit 20, to be described below. Thus, focusing, zoom driving, and so on are performed on the basis of control commands from the photography control unit 20. The stroboscope 15 is capable of irradiating an object with light in accordance with control executed by the photography control unit 20.

The shutter 11 for controlling an exposure time is disposed to the rear of the lens 10. The shutter 11 is drive-controlled by the photography control unit 20. The shutter 11 is normally open during through-the-lens image photography. At this time, control of an exposure amount of the CCD 12 is realized using an electronic shutter function of the CCD 12. When a so-called still image is photographed (to be referred to hereafter as "still photography"), the exposure amount of the CCD 12 is controlled by the shutter 11.

The CCD 12, which serves as a two-dimensional imaging device, is disposed to the rear of the shutter 11, and subjects an object image formed by the lens 10 to photoelectric conversion to obtain an electric signal. It should be noted that although a CCD is used as the imaging device in this embodiment, the imaging device is not limited thereto, and a two-dimensional imaging device such as a CMOS (Complementary Metal Oxide Semiconductor) may of course be used instead.

The CCD control unit 13 is connected to a CCD interface 21. The CCD control unit 13 receives a control signal from a sequence controller (to be referred to hereafter as a "body CPU") 22, to be described below, via the CCD interface 21. On the basis of this control signal, the CCD control unit 13 subjects a power supply of the CCD 12 to ON/OFF control and so on, adjusts a photography timing, amplifies a photoelectric conversion signal (gain adjustment), and so on.

An analog image signal obtained by the CCD 12 is input into the image processing device 3 and converted into a digital signal by the CCD interface 21.

The image processing device 3 is an ASIC, for example, which comprises the photography control unit 20 described above, the CCD interface 21, the body CPU 22, a luminance calculation unit 23, an AF calculation unit 24, a first image processing unit 25, a face detection unit 26, the second image processing unit 27, a third image processing unit 28, and so on. These units are connected to each other via a data bus 30 provided in the image processing device 3.

The body CPU 22 controls the respective units in the imaging apparatus 1. The luminance calculation unit 23 calculates information relating to a luminance distribution of an object by averaging an image signal in each of a plurality of predetermined divided areas and converting the image signal into a luminance signal.

The AF calculation unit 24 focuses on the object by dividing the image signal into predetermined areas, calculating contrast information in relation to each area, and driving the lens 10 in synchronization with the control of the lens driving unit 14 such that the contrast of a predetermined area is maximized.

The first image processing unit 25, second image processing unit 27, and third image processing unit 28 perform various types of image processing, such as OB subtraction, color correction, gradation correction, monochrome/color mode processing, white balance processing, and through-the-lens image processing, on the image signal obtained by the imaging unit 2. In particular, white balance processing performed by the second image processing unit 27 will be described in detail below.

The face detection unit 26 detects a position and a size of a face area by creating an image of a size suitable for face detection on the basis of the image signal. Using a well known technique such as that disclosed in JP2006-227995A, for example, a processing subject image is searched for a part having a similar characteristic amount to a face part, a face candidate area is extracted, a face is determined using various information relating to the face candidate area, and the position and size of the face area are detected.

More specifically, the Viola-Jones face detection method disclosed in P. Viola and M. Jones, "Rapid object detection using a boosted cascade of simple features," Proc. Of CVPR, 2001, for example, may be employed as the face detection method. In the Viola-Jones face detection method, a face is detected by comparing an optimum rectangular filter for face detection, which is selected using Adaboost learning, with a face detection subject image. The speed of the processing is increased by arranging the rectangular filter in cascade form.

In addition to the constitutional elements described above, the data bus 30 is connected to a compression unit 31, an SDRAM (Synchronous Dynamic Random Access Memory) control unit 32, a flash memory control unit 33, an operation detection unit 34, a recording medium control unit 35, a video signal output unit 36, and so on.

The compression unit 31 is a block for compressing image data and so on stored in an SDRAM 41, to be described below, in a JPEG format. It should be noted that image compression method is not limited to JPEG, and another compression method may be applied.

The flash memory control unit 33 is connected to a flash memory 42. The flash memory 42 stores an image processing program for controlling each processing performed in the imaging apparatus 1. The body CPU 22 controls the respective units in accordance with the program stored in the flash memory 42. The flash memory 42 is an electrically rewritable non-volatile memory.

The SDRAM 41 is connected to the data bus 30 via the SDRAM control unit 32. The SDRAM 41 is a memory for temporarily storing image information subjected to image processing by the first image processing unit 25 and so on or image information compressed by the compression unit 31.

The photography control unit 20 is connected to each unit such as the body CPU 22 via the data bus 30. The recording medium control unit 35 is connected to a recording medium 43, and performs control for recording image data and so on in the recording medium 43. The recording medium 43 is constituted by a rewritable recording medium such as an xD picture card (registered trademark), a memory stick (registered trademark), or a hard disk drive (HD), which can be inserted into and removed from an imaging apparatus main body.

The video signal output unit 36 is connected to a display monitor 46 via a display monitor control unit 45. The video signal output unit 36 is a circuit for converting image data stored in the SDRAM 41 or the recording medium 43 into a video signal to be displayed on the display monitor 46. The display monitor 46 is a liquid crystal display device disposed on a back surface of the imaging apparatus main body, for example, but is not limited to the back surface as long as it can be viewed by a photographer. Moreover, the display monitor 46 is not limited to liquid crystal display device, and another display device may be employed.

An operating unit 47 includes a switch for detecting a shutter release indicating that a photography instruction has been issued in relation to the imaging apparatus 1, a mode dial, a power switch, a control dial, a playback button, a menu button, arrow keys, an OK button, and so on, and is connected to the data bus 30 via the operation detection unit 34.

In the imaging apparatus 1 constituted as described above, when a user switches the power switch (not shown) ON, a display sequence to be described below is executed by the body CPU 22, whereby the respective units are activated in accordance with control performed by the body CPU 22. An operation flow of the display sequence will now be described with reference to FIG. 2.

[Display Sequence]

When the user switches the power supply ON, through-the-lens image photography is begun by the imaging unit 2 in a step SA1. An image signal of the through-the-lens image is converted into a digital signal by the CCD interface 21, whereupon the converted image signal (to be referred to hereafter as a "through-the-lens image signal") is input into the image processing device 3.

In a step SA2, first image processing, or more specifically well known OB correction processing and so on, is performed on the through-the-lens image signal by the first image processing unit 25. In a step SA3, the face detection unit 26 detects the position and size of a face by converting the through-the-lens image signal into a suitable image for face detection and performing a matching comparison between the converted image and a face characteristic amount in each of a plurality of predetermined areas. In a step SA4, object estimation is performed. Object estimation processing will be described in detail below using a flowchart shown in FIG. 3.

In a step SA5, second image processing, or more specifically white balance processing, is performed by the second image processing unit 27. The white balance processing will be described in detail below using a flowchart shown in FIG. 6.

In a step SA6, third image processing, or more specifically well known processing such as YC conversion processing, gradation conversion processing, compression, and resizing, is performed by the third image processing unit 28. In a step SA7, a processed through-the-lens image signal is displayed on the display monitor 46.

In a step SA8, a determination is made as to whether or not a face detection result has varied relative to a previous face detection result. When the face detection result has varied, for example when a face was detected in the previous through-the-lens image signal but not detected in the current through-the-lens image signal, or conversely when a face was not detected in the previous through-the-lens image signal but detected in the current through-the-lens image signal, the routine advances to a step SA9.

In the step SA9, a determination is made as to whether or not an object distance has varied relative to the previous through-the-lens image signal. Distance variation is determined by calculating a difference in contrast between a focus area in a through-the-lens image signal obtained during a previous autofocus operation and the same area of the through-the-lens image signal obtained in the current operation, and the object distance is determined to have varied when the difference equals or exceeds a predetermined value. When it is determined, as a result, that the object distance has varied, the routine advances to a step SA10.

In the step SA10, autofocus processing is performed. More specifically, a focusing operation is performed in relation to the object by repeating autofocus photography and lens driving a plurality of times, dividing a signal obtained in the photography into a plurality of areas (for example, 20 vertical divisions and 30 horizontal divisions), calculating the contrast of each area, and driving the lens 10 in a position having a maximum contrast value.

A well known algorithm is used to determine an area, from among the divided areas, in which the lens is to be driven in accordance with the contrast. In this embodiment, for example, when a face is detected using the preceding face detection result, an area determined to be closest to the face on the basis of face position information and size information is prioritized, and when a face is not detected, a closest area is prioritized.

In a step SA11, an object distance distribution of the respective divided areas is calculated. More specifically, when the lens driving operation of the autofocus processing is complete, the object distance of each divided area is calculated on the basis of information relating to the contrast at the time of each photography operation, the lens position at that time, and lens position information following a final driving operation, and the calculated object distances are stored in a predetermined memory as object distance distribution information. The object distance is a distance in a depth direction of a photographed image, and in this embodiment, the object distance is a distance from the CCD 12 to the object. It should be noted, however, that the object may be a background as well as a photography subject person or object. The area prioritized during the autofocus processing and the contrast value of the area are also, stored in memory. When this processing is complete, the routine advances to a step SA12.

Meanwhile, when the face detection result has not varied between the previous and current operations in the step SA5 or when the object distance has not varied in the step SA9, the routine advances to the step S12.

In the step SA12, a luminance distribution of the object is calculated using the through-the-lens image signal, and the luminance of the object area and an object periphery area is calculated using the face detection result. In a step SA13, a shutter speed, an aperture, and an ISO sensitivity of the through-the-lens image are determined on the basis of the object luminance distribution information obtained in the step SA12, and APEX values (av, tv, sv) thereof are stored in memory to be reflected during a subsequent through-the-lens image exposure operation.

In a step SA14, the operation detection unit 34 determines whether or not the photographer has pressed the release button. When it is determined that the release button has been pressed, the routine advances to a step SA15, in which still photography is implemented. Still photography processing will be described below using a flowchart shown in FIG. 4. When still photography is complete or when the release button has not been pressed in the step SA14, the routine advances to a step SA16.

In the step SA16, the operation detection unit 34 determines whether or not the photographer has pressed the power switch to turn the power supply OFF. When it is determined that the power supply is not OFF, the routine returns to the step SA1, where the processing described above is executed repeatedly until the user turns the power supply OFF. When it is determined that the power supply is OFF, on the other hand, the routine advances to a step SA17, in which display sequence standby processing is performed, whereupon the processing of the flowchart is terminated.

[Object Estimation]

Figure 2:
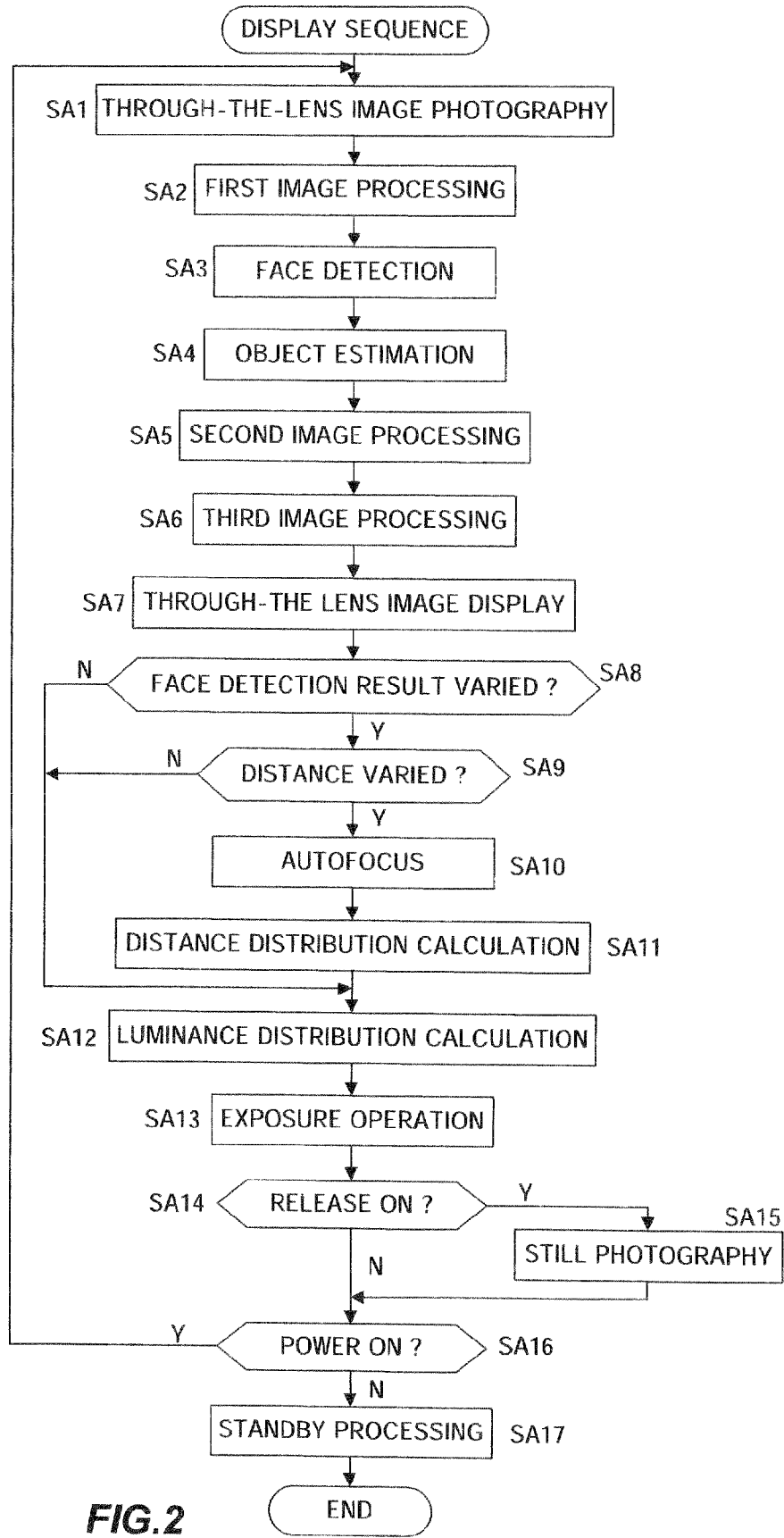
FIG. 2 is a flowchart showing a processing procedure of a display sequence.
Figure 3:
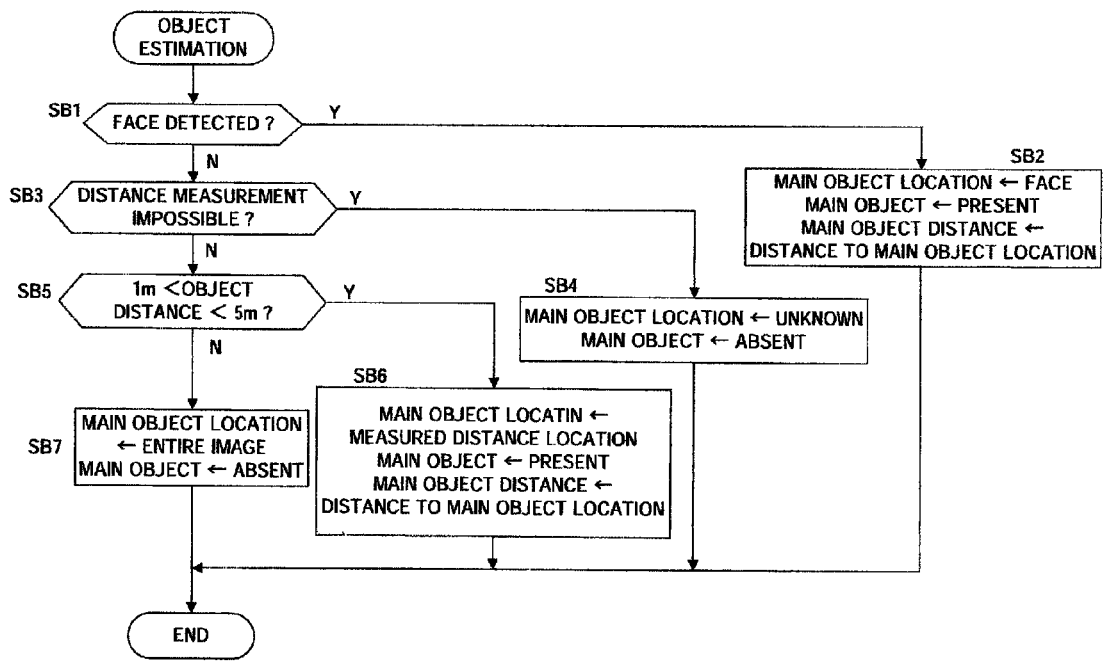
FIG. 3 is a flowchart showing in detail an object estimation processing.

FIG. 3 is a flowchart showing in detail the object estimation processing performed in the step SA4 of the flowchart shown in FIG. 2. In the object estimation processing, as will be described below, the presence of a main object, the location of the main object, and a distance to the main object are determined. It should be noted that the object distance distribution information determined in the step SA11 of FIG. 2 is used to determine the distance to the main object.

In a step SB1, a determination as to whether or not a face has been detected is made on the basis of the face detection result obtained in the step SA3 of FIG. 2. When it is determined that a face has been detected, the routine advances to a step SB2. In the step SB2, "face" is set as the main object location, "present" is set as the main object, and "distance to main object location" is set as the main object distance, whereupon the object estimation processing is terminated.

When it is determined in the step SB1 that a face has not been detected, on the other hand, the routine advances to a step SB3. In the step SB3, a determination is made as to whether or not distance measurement is impossible. For example, when a contrast value cannot be detected during the autofocus processing of the step SA 10 in FIG. 2 or the like such that autofocus cannot be performed, distance measurement is determined to be impossible, whereupon the routine advances to a step SB4. In the step SB4, "unknown" is set as the main object location and "absent" is set as the main object, whereupon the object estimation processing is terminated.

When it is determined in the step SB3 that distance measurement is possible, the routine advances to a step SB5. In the step SB5, a determination is made as to whether or not the object distance detected in the step SA4 of FIG. 2 is longer than 1 m and shorter than 5 m. When the object distance is determined to be longer than 1 m and shorter than 5 m, the routine advances to a step SB6. In the step SB6, "measured distance location" is set as the main object location, "present" is set as the main object, and "distance to main object location" is set as the main object distance, whereupon the object estimation processing is terminated. In the white balance adjustment apparatus according to this embodiment, "1 m" and "5 m" are set as a determination reference of the object estimation processing, but this invention is not limited thereto, and "2 m" and "6 m" may be set as the determination reference in another example.

Meanwhile, when it is determined in the step SB5 that the object distance is equal to or smaller than 1 m or equal to or greater than 5 m, the routine advances to a step SB7. In the step SB7, "entire image" is set as the main object location and "absent" is set as the main object, whereupon the object estimation processing is terminated.

[Still Photography]

Figure 4:
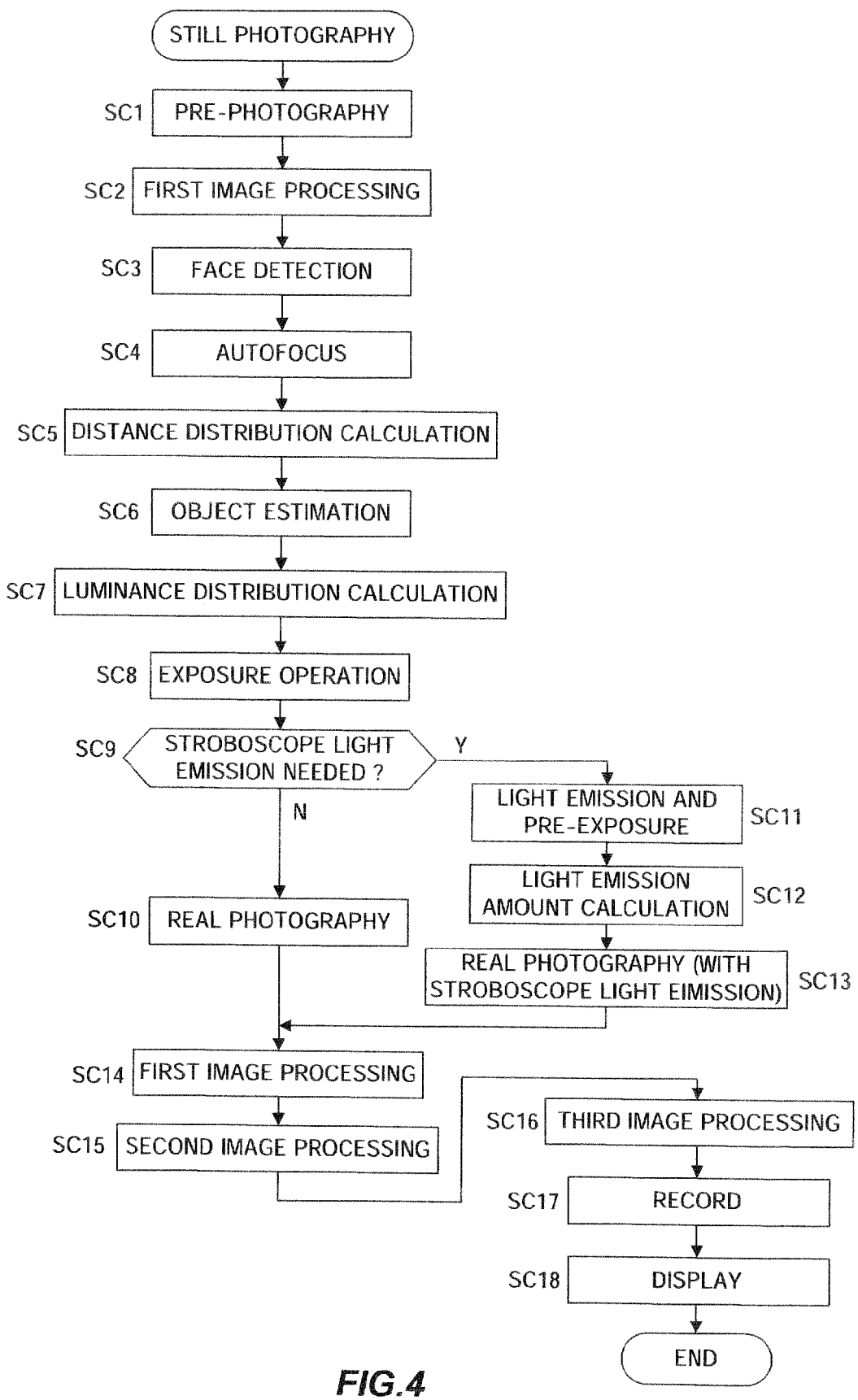
FIG. 4 is a flowchart showing a processing procedure of a still photography.

Next, the still photography performed in the step SA15 of the display sequence described using the flowchart of FIG. 2 will be described with reference to FIG. 4. FIG. 4 is a flowchart showing a processing procedure of the still photography.

In a step SC1 of FIG. 4, pre-photography is implemented. The image signal obtained by the imaging unit 2 is digitized in the CCD interface 21 and then transferred to the respective internal units of the image processing device 3.

In a step SC2, the first image processing unit 25 performs first image processing such as OB processing on the image signal obtained in the pre-photography. In a step SC3, the face detection unit 26 performs face detection processing on the basis of the image signal following the first image processing.

In a step SC4, autofocus processing is performed. In a step SC5, the object distance distribution is calculated. In a step SC6, the object is estimated. The face detection processing, autofocus processing, object distance distribution calculation processing and object estimation processing are identical to the processing performed in the steps SA3, SA10, SA11 and SA4 of FIG. 2, respectively, and therefore detailed description thereof has been omitted.

In a step SC7, the object luminance distribution is calculated. This processing is identical to the processing performed in the step SA12 of FIG. 2. In a step SC8, a target luminance for determining exposure conditions is determined on the basis of object luminance distribution information obtained in the step SC7, whereupon exposure conditions such as the shutter speed, aperture, and ISO sensitivity of a main photography operation are determined on the basis of the target luminance and APEX values (av, tv, sv) thereof are stored.

In a step SC9, the need for light emission from the stroboscope 15 is determined. For example, light emission from the stroboscope 15 is determined to be required in backlight or low luminance conditions. When it is determined, as a result, that stroboscope light emission is not required, the routine advances to a step SC10. In the step SC10, photography is performed under the exposure conditions determined in the step SC8 by controlling the aperture stop 10a, the shutter 11, and the CCD 12. An image signal obtained by the imaging unit 2 is converted into a digital signal in the CCD interface 21 and then transferred to the respective internal units of the image processing device 3.

When it is determined in the step SC9 that light emission from the stroboscope 15 is required, the routine advances to a step SC11. In the step SC11, stroboscope light emission and pre-exposure for photography purposes are implemented, whereupon obtained CCD output data are read and subjected to predetermined processing. In a step SC12, information relating to the object luminance distribution during stroboscope irradiation is created on the basis of the CCD output data obtained in the step SC11, and a stroboscope light emission amount is calculated on the basis of the created luminance distribution information.

In a step SC13, stroboscope light emission and photography are performed under the exposure conditions determined in the step SC8 and at the light emission amount calculated in the step SC12 by controlling the aperture stop 10a, the shutter 11, the stroboscope 15, the CCD 12, and so on. An image signal obtained by the imaging unit 2 is converted into a digital signal in the CCD interface 21 and then transferred to the respective internal units of the image processing device 3.

In a step SC14, the first image processing unit 25 implements first image processing such as well known OB correction processing on the image signal. Following the first image processing, the image signal is transferred to the second image processing unit 27.

In a step SC15, the second image processing unit 27 implements second image processing such as white balance adjustment processing on the image signal transferred from the first image processing unit 25. Following the second image processing, the image signal is transferred to the third image processing unit 28. The white balance adjustment processing performed by the second image processing unit 27 will be described in detail below using FIG. 6.

In a step SC16, the third image processing unit 28 implements third image processing such as color correction, noise correction, YC conversion, gradation conversion, and compression on the image signal transferred from the second image processing unit 27.

In a step SC17, the image-processed image is recorded in the recording medium 43. In a step SC18, the image-processed image is displayed on the display monitor 46 via the video signal output unit 36 and so on.

Figure 5:
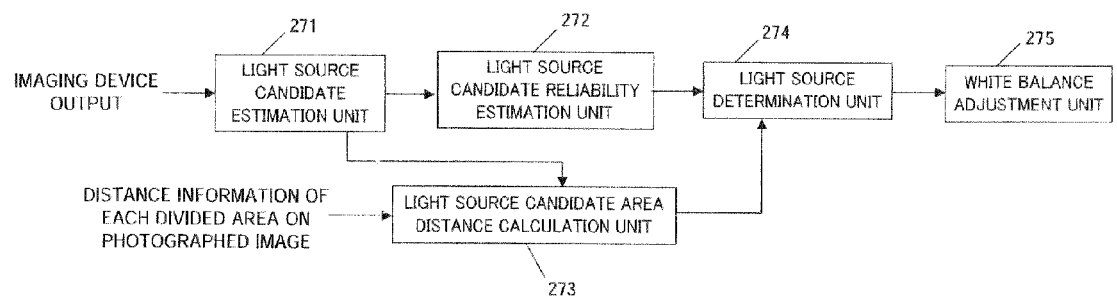
FIG. 5 is a block diagram showing in detail the constitution of a second image processing unit.

FIG. 5 is a block diagram showing in detail the constitution of the second image processing unit 27. The second image processing unit 27 comprises a light source candidate estimation unit 271, a light source candidate reliability estimation unit 272 (to be referred to hereafter as a reliability estimation unit 272), a light source candidate area distance calculation unit 273 (to be referred to hereafter as a distance calculation unit 273), a light source determination unit 274, and a white balance adjustment unit 275. Processing performed by the respective units 271 to 275 will now be described using the flowchart shown in FIG. 6.

[White Balance Processing]

Figure 6:
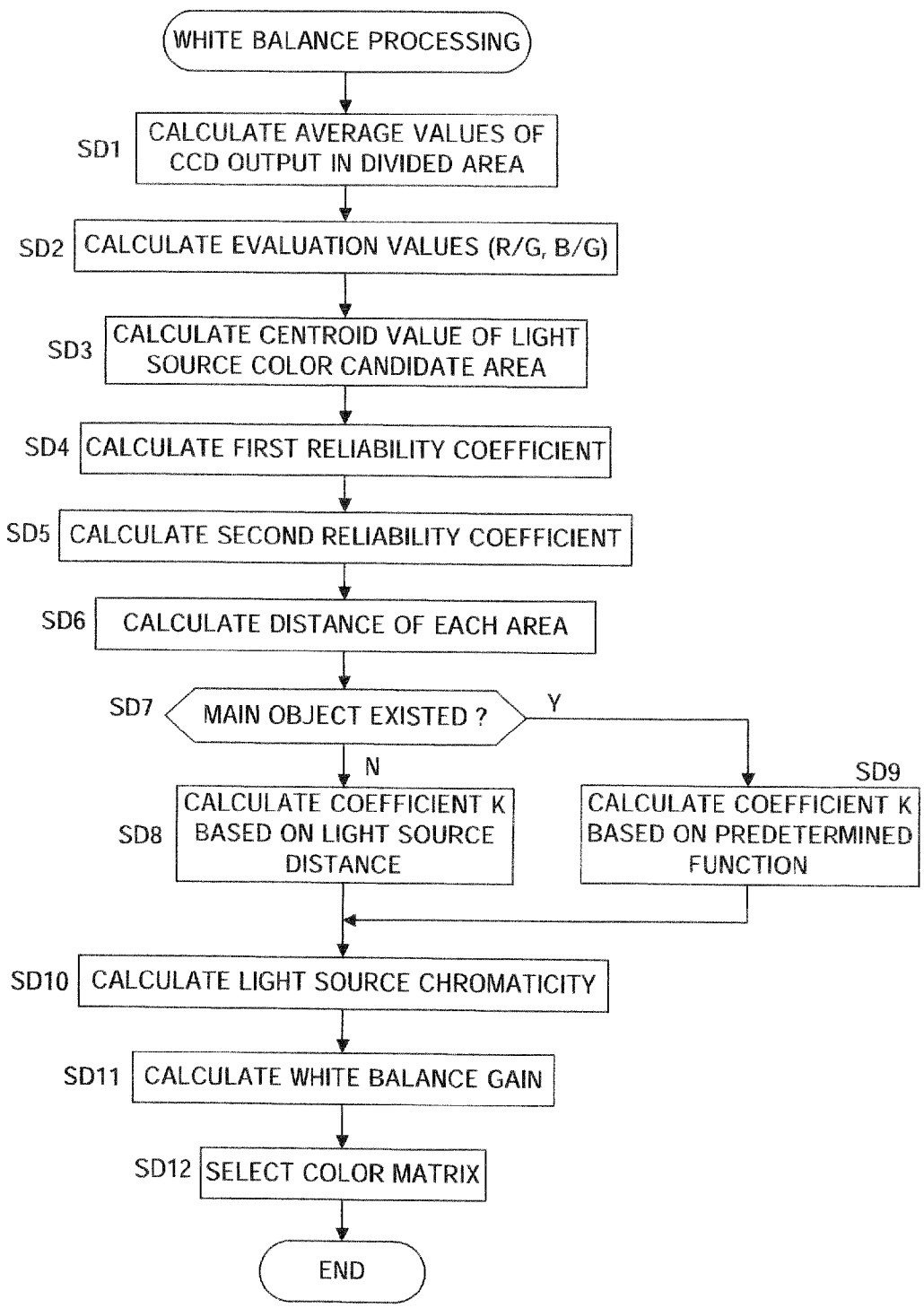
FIG. 6 is a flowchart showing in detail the content of a white balance processing.

FIG. 6 is a flowchart showing in detail the content of the white balance processing performed by the second image processing unit 27. Processing of steps SD1 to SD3 is performed by the light source candidate estimation unit 271, and processing of steps SD4 and SD5 is performed by the reliability estimation unit 272. Further, processing of steps SD6 to SD9 is performed by the distance calculation unit 273, processing of a step SD 10 is performed by the light source determination unit 274, and processing of steps SD11 and SD12 is performed by the white balance adjustment unit 275.

Figure 7:
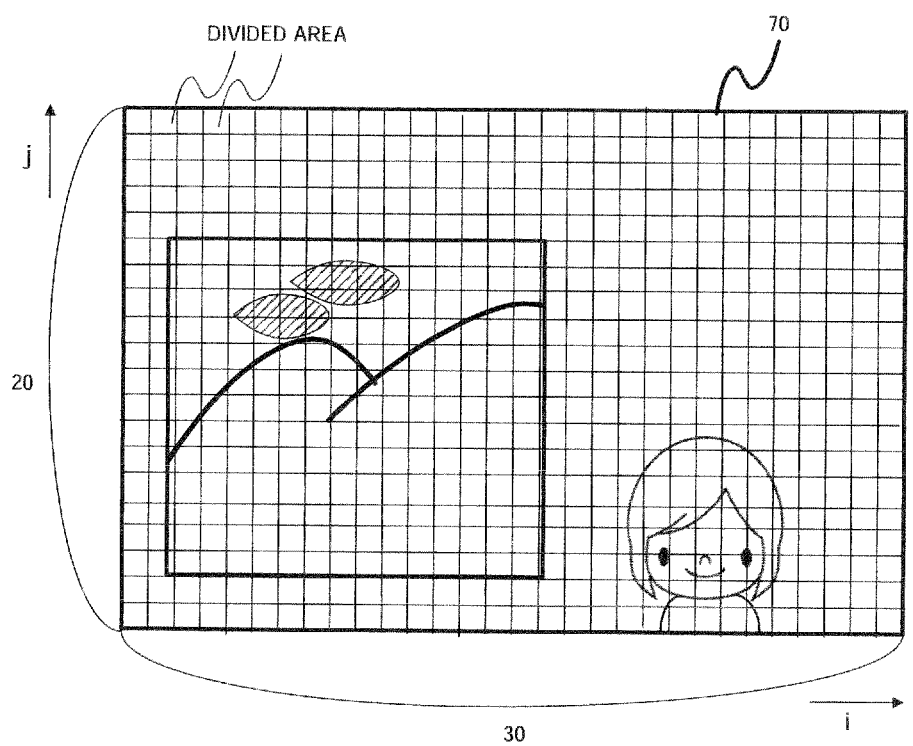
FIG. 7 is a view showing an example of a photographed image divided into 20×30 areas.

In the step SD1, the image obtained in the photography operation is divided into a plurality of areas (for example, 20 vertical divisions and 30 horizontal divisions), and average values of CCD output values R, G, B of each color are calculated in each divided area. FIG. 7 is a view showing an example of a photographed image 70 divided into 20×30 areas. Here, an average value of the R (red) value, an average value of the G (green) value, and an average value of the B (blue) value in a divided area located in an i position in a horizontal direction and a j position in a vertical direction, using the lower left corner of the photographed image 70 as a reference, are set respectively as Rij, Gij, Bij.

In the step SD2, Rij/Gij, Bij/Gij are calculated as evaluation values of each divided area. The evaluation value is an index used to estimate a light source color from a photographed image.

In the step SD3, the evaluation values determined in the step SD2 are plotted on a plane having R/G as an x axis and B/G as a y axis, whereupon a centroid value of the evaluation values included in respective light source color candidate areas set on the plane is determined.

Figure 8:
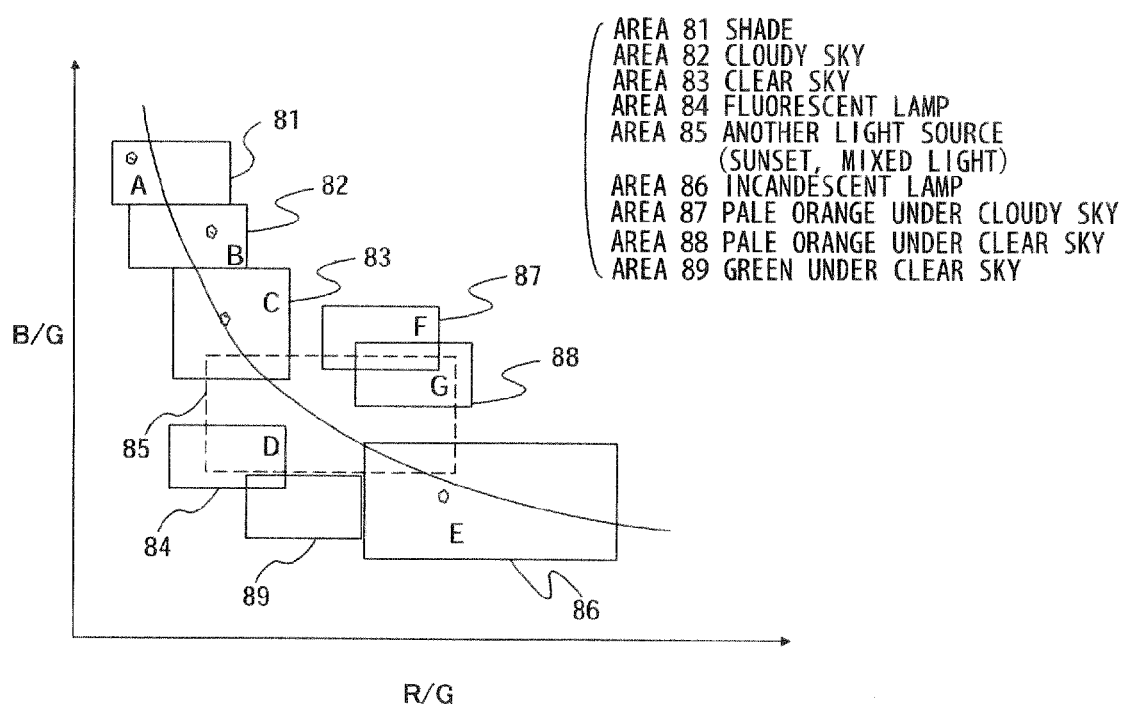
FIG. 8 is a view showing an example of light source color candidate areas set on a plane having R/G as an x axis and B/G as a y axis.

FIG. 8 is a view showing an example of light source color candidate areas 81 to 86 set on a plane having R/G as an x axis and B/G as a y axis. The light source color candidate areas 81 to 86 define a chromaticity distribution range of an achromatic color believed to have been illuminated by a light source, and respectively define the chromaticity distribution range of shade, cloudy sky, clear sky, a fluorescent lamp, another light source, and an incandescent lamp. The other light sources of the light source color candidate area 85 include sunset, mixed light from various light sources, and so on.

In addition to the light source color candidate areas 81 to 86, FIG. 8 shows estimable light source color candidate areas 87 to 89 for estimating the light source color. The estimable light source color candidate areas 87 to 89 define the chromaticity distribution range of a specific chromatic color believed to have been illuminated by a light source, and respectively define the chromaticity distribution range of pale orange under a cloudy sky, pale orange under a clear sky, and green under a clear sky.

The light source color candidate areas 81 to 86 and estimable light source color candidate areas 87 to 89 described above are areas for estimating a light source color from a photographed image.

The centroid value of the evaluation values is determined by calculating an average value of the evaluation values included in each of the light source color candidate areas 81 to 86. Here, respective centroid values (x, y) of the light source color candidate areas 81 to 86 are expressed as ZPOINT__1 (x, y) to ZPOINT__6 (x, y). For example, when the average value of the evaluation values included in the light source color candidate area 81 is R/G=0.2, B/G=0.8, the centroid value is expressed as ZPOINT__1 (0.2, 0.8). Further, when no evaluation values are included in the light source color candidate area 81, the centroid value is expressed as ZPOINT__1 (0, 0).

It should be noted that here, processing is performed to apply the evaluation values of each divided area of the photographed image to the light source color candidate areas 81 to 86 and estimable light source color candidate areas 87 to 89 shown in FIG. 8, and this processing is equivalent to processing for specifying a light source color estimation area for estimating the light source color in the photographed image, or in other words processing for specifying an area having equal chromaticity to the chromaticity of the light source of the light source color candidate areas 81 to 86 and estimable light source color candidate areas 87 to 89.

In the step SD4, reliability coefficients $\alpha 1$ to $\alpha 6$ of the light source colors corresponding to the respective light source color candidate areas 81 to 86 and reliability coefficients $\alpha 7$ to $\alpha 9$ of the estimable light source colors corresponding to the respective estimable light source color candidate areas 87 to 89 are determined. The reliability coefficients $\alpha 1$ to $\alpha 9$ are coefficients indicating the probability of the light source color or estimable light source color used during white balance adjustment of the photographed image, and will be referred to here as first reliability coefficients. As will be described below, the first reliability coefficients $\alpha 1$ to $\alpha 9$ are determined on the basis of the information indicating the object luminance during photography, determined in the step SC7 of the flowchart shown in FIG. 4, or the information indicating the target luminance for use during photography, determined in the step SC8 of the flowchart shown in FIG. 4 (in this embodiment, the value determined in the step SC8 is used, and this value will be referred to hereafter as the "photography luminance" where appropriate).

Figure 9:
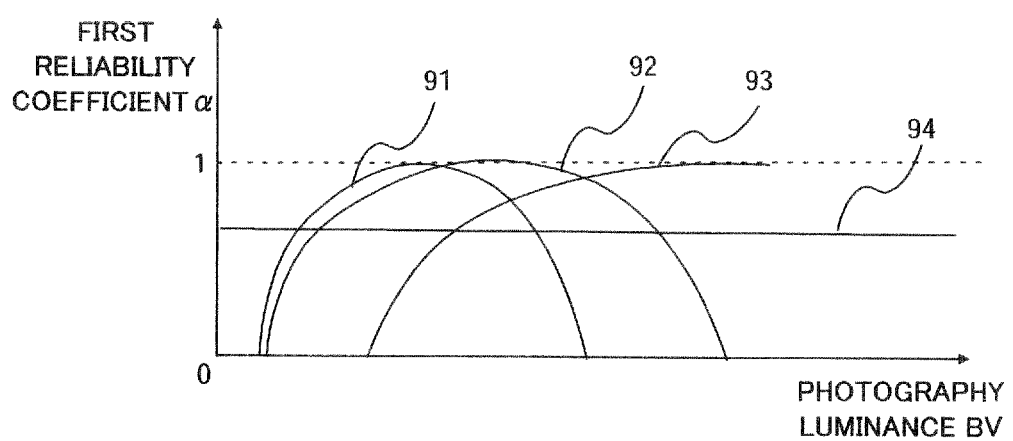
FIG. 9 is a view showing an example of reliability coefficient calculation functions for calculating first reliability coefficients.

FIG. 9 is a view showing an example of reliability coefficient calculation functions for calculating the first reliability coefficients $\alpha 1$ to $\alpha 9$. In FIG. 9, the abscissa axis shows the photography luminance (object luminance), and the ordinate axis shows the first reliability coefficients. A reliability coefficient calculation function corresponding to the photography luminance is set on the basis of a property whereby an absolute brightness differs according to the light source and the photography luminance also differs according to the light source. In the example shown in FIG. 9: 91 denotes a reliability coefficient calculation function of the light source colors corresponding to the light source color candidate areas 84, 86; 92 denotes a reliability coefficient calculation function of the light source colors corresponding to the light source color candidate areas 81, 82 and the estimable light source color corresponding to the estimable light source color candidate area 87; 93 denotes a reliability coefficient calculation function of the light source color corresponding to the light source color candidate area 83 and the estimable light source colors corresponding to the estimable light source color candidate areas 88, 89; and 94 denotes a reliability coefficient calculation function of the light source color corresponding to the light source color candidate area 85.

For example, the reliability coefficient calculation function 93 of sunlight when the light source is clear sky (the light source color candidate area 83) is set such that the first reliability coefficient a3 increases as the photography luminance increases. When the light source is a fluorescent lamp (the light source color candidate area 84), on the other hand, the light source luminance is not so high, and therefore the photography luminance is lower than that obtained from the sunlight in a clear sky. Hence, the reliability coefficient calculation function 91 is set such that the first reliability coefficient α4 increases in an area where the luminance is equal to or smaller than a predetermined luminance.

The reliability estimation unit 272 stores the reliability coefficient calculation functions 91 to 94 for calculating the first reliability coefficients from the photography luminance, and calculates the first reliability coefficients α1 to α9 from the functions 91 to 94 and the photography luminance. Instead of the reliability coefficient calculation functions 91 to 94, a table defining a relationship between the photography luminance and the first reliability coefficients such as that shown in FIG. 9 may be stored in the reliability estimation unit 272 such that the first reliability coefficients α1 to α9 are calculated from the table and the photography luminance.

In the step SD5, second reliability coefficients α'1 to α'6 of the light source colors corresponding to the respective light source color candidate areas 81 to 86 and second reliability coefficients α'7 to α'9 of the estimable light source colors corresponding to the respective estimable light source color candidate areas 87 to 89 are determined. Here, the second reliability coefficients α'1 to α'9 are determined on the basis of the number of evaluation values included in each area 81 to 89.

Figure 10:
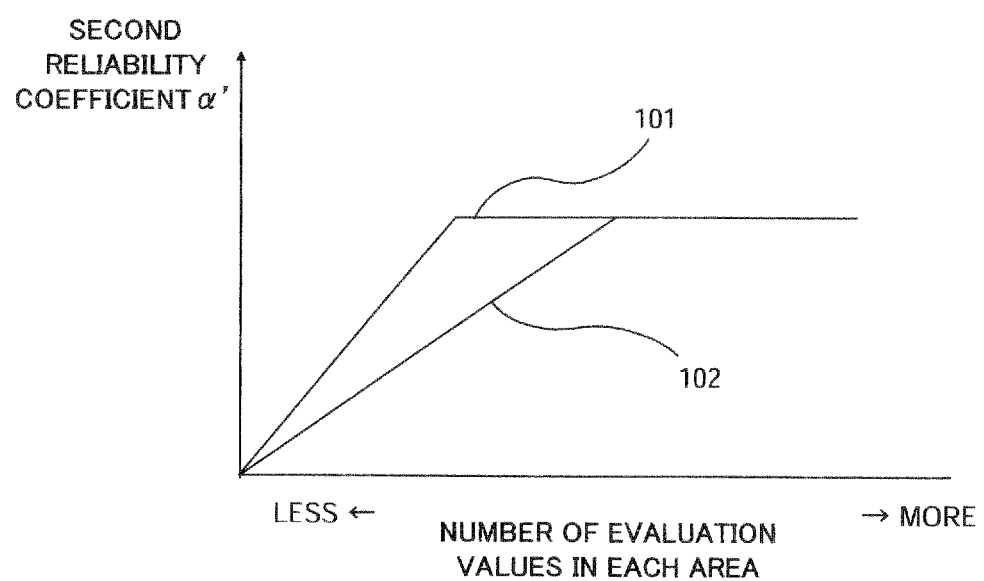
FIG. 10 is a view showing an example of reliability coefficient calculation functions for calculating second reliability coefficients.

FIG. 10 is a view showing an example of reliability coefficient calculation functions for calculating the second reliability coefficients α'1 to α'9. In FIG. 10, the abscissa axis shows the number of evaluation values included in each area 81 to 89 and the ordinate axis shows the second reliability coefficients. In the example shown in FIG. 10, 101 denotes a reliability coefficient calculation function of the light source colors corresponding to the light source color candidate areas 84, 86, and 102 denotes a reliability coefficient calculation function of the light source colors and estimable light source colors corresponding to the remaining areas 81 to 83, 85, 87 to 89. As shown in FIG. 10, the reliability coefficient increases as the number of evaluation values included in an area increases. Further, when the number of evaluation values included in an area is zero, the second reliability coefficient α' is set at 0.

It should be noted that when the number of evaluation values included in the respective areas 81 to 89 is large, this means that the light source color estimation area for estimating the light source color in the photographed image is large (or that the number of light source color estimation areas is large).

Once the respective second reliability coefficients α'1 to α'9 have been calculated on the basis of the reliability coefficient calculation functions 101, 102 shown in FIG. 10 and the number of evaluation values included in each area 81 to 89, the routine advances to the step SD6. In the step SD6, the distance of the object of each area 81 to 89 from the image plane is calculated.

FIG. 11 is a view showing an example of distance information for each of the plurality of divided areas (i, j) determined in the step SD1. This distance information is determined in the step SC5 of the flowchart shown in FIG. 4.

First, distance values of the divided areas corresponding to the evaluation values included in the respective light source color candidate areas 81 to 86 and estimable light source color candidate areas 87 to 89 are read, whereupon a distance histogram is created for each area 81 to 89 on the basis of distance information shown in FIG. 11.

Figure 12:
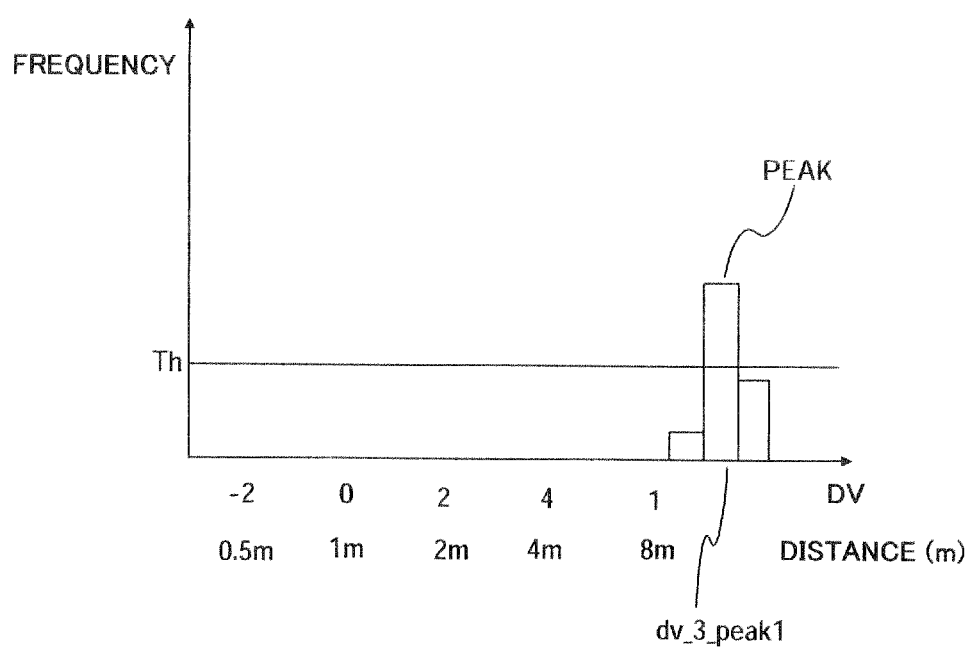
FIG. 12 is a view showing an example of a distance histogram of a light source color candidate area 83.
Figure 13:
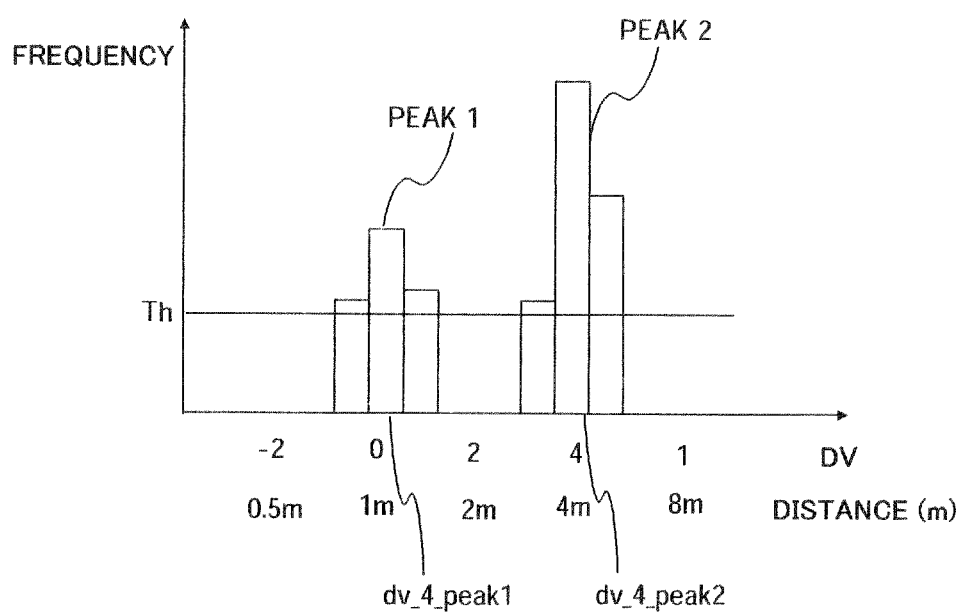
FIG. 13 is a view showing an example of a distance histogram of a light source color candidate area 84.
Figure 14:
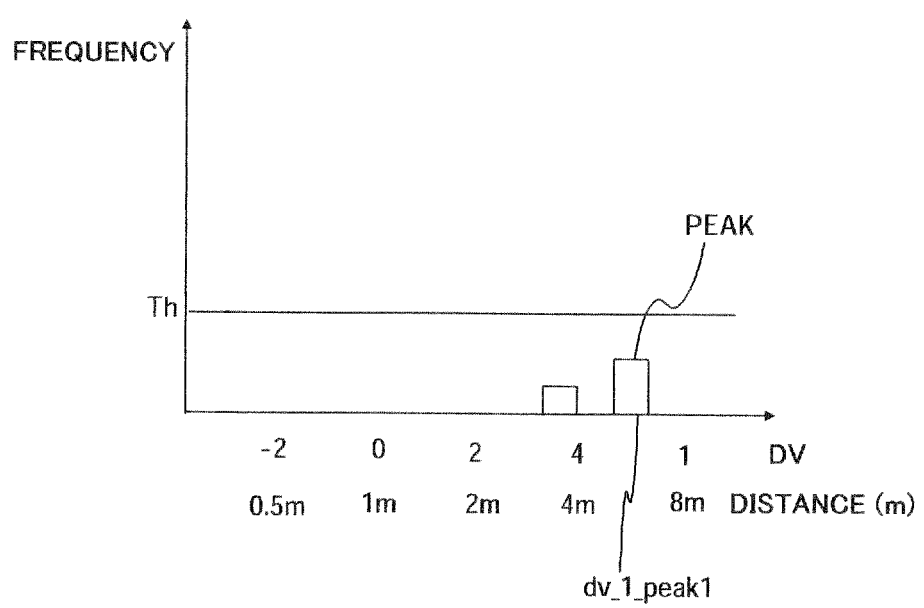
FIG. 14 is a view showing an example of a distance histogram of a light source color candidate area 81.

FIGS. 12 to 14 are views respectively showing examples of the distance histograms of the light source color candidate areas 83, 84, 81. In FIGS. 12 to 14, the abscissa axis shows distance and the ordinate axis shows frequency (number). Here, the distance at a peak value that equals or exceeds a predetermined frequency threshold Th on the created distance histogram is set as the distance of the corresponding light source. In the example shown in FIG. 12, the distance of the light source corresponding to the light source color candidate area 83 is set as dv_3_peak1.

When a plurality of distance peak values that equal or exceed the predetermined frequency threshold Th exists, the plurality of peak value distances are set as the distance of the corresponding light source. In the example shown in FIG. 13, two distance peak values that equal or exceed the predetermined frequency threshold Th exist, and therefore the distance of the light source corresponding to the light source color candidate area 84 is set as dv_4_peak1 and dv_4_peak2.

When the distance peak value is smaller than the predetermined frequency threshold Th, the distance of a maximum value is set as the distance of the corresponding light source. In the example shown in FIG. 14, the distance of the light source corresponding to the light source color candidate area 81 is set as dv_1_peak1.

In the step SD7, a determination is made as to whether or not a main object exists. This determination is made on the basis of whether "present" or "absent" has been determined in relation to the main object in the processing of the flowchart shown in FIG. 3. When it is determined that a main object does not exist, the routine advances to the step SD8.

In the step SD8, a distance reliability coefficient K is determined on the basis of the light source distance determined in the step SD6. The distance reliability coefficient K is a coefficient expressing the reliability (probability) of the light source in accordance with the light source distance, and is set such that the reliability is steadily higher as the value thereof increases.

Figure 15:
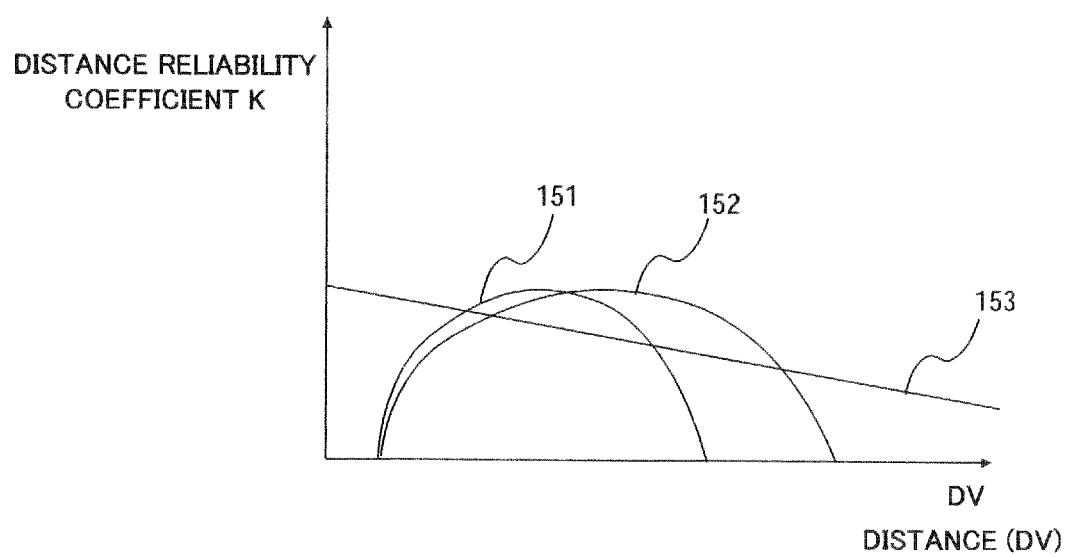
FIG. 15 is a view showing an example of a distance reliability coefficient calculation function for calculating a distance reliability coefficient K in a case where a main object does not exist.

FIG. 15 is a view showing an example of a distance reliability coefficient calculation function for calculating the distance reliability coefficient K. In FIG. 15, the abscissa axis shows the light source distance and the ordinate axis shows the distance reliability coefficient K. In the example shown in FIG. 15: 151 denotes a distance reliability coefficient calculation function of the light source corresponding to the light source color candidate area 86; 152 denotes a distance reliability coefficient calculation function of the light source corresponding to the light source color candidate area 84; and 153 denotes a distance reliability coefficient calculation function of the light source corresponding to the remaining areas 81 to 83, 85, 87 to 89.

For example, synthetic light such as a fluorescent lamp (the light source color candidate area 84) and an incandescent lamp (the light source color candidate area 86) illuminate parts that are close in terms of distance, such as room interiors. Such light sources are unlikely to illuminate long distances, and moreover are not sufficiently bright to illuminate long distances. Hence, when the light source distance is long, these light sources are unlikely to be the main light source of the image, and therefore the distance reliability coefficient is reduced.

Further, in a case where a plurality of light sources exists, the side that is closest to the photographer is more likely to illuminate the object, and therefore this side is likely to correspond to the light source that is closest to the photographer. Hence, in the distance reliability coefficient calculation function 153, the distance reliability coefficient is increased as the distance decreases.

In the step SD8, the distance reliability coefficients K of the light sources corresponding to the respective areas 81 to 89 are calculated on the basis of the distances determined in the step SD6 and the distance reliability coefficient calculation functions shown in FIG. 15.

Instead of the distance reliability coefficient calculation functions, table data defining a relationship between the light source distance and the distance reliability coefficient K may be stored in the distance calculation unit 273 such that the distance reliability coefficients K of the light sources corresponding to the respective areas 81 to 89 are calculated on the basis of the distances determined in the step SD6 by referring to the table data.

Figure 16:
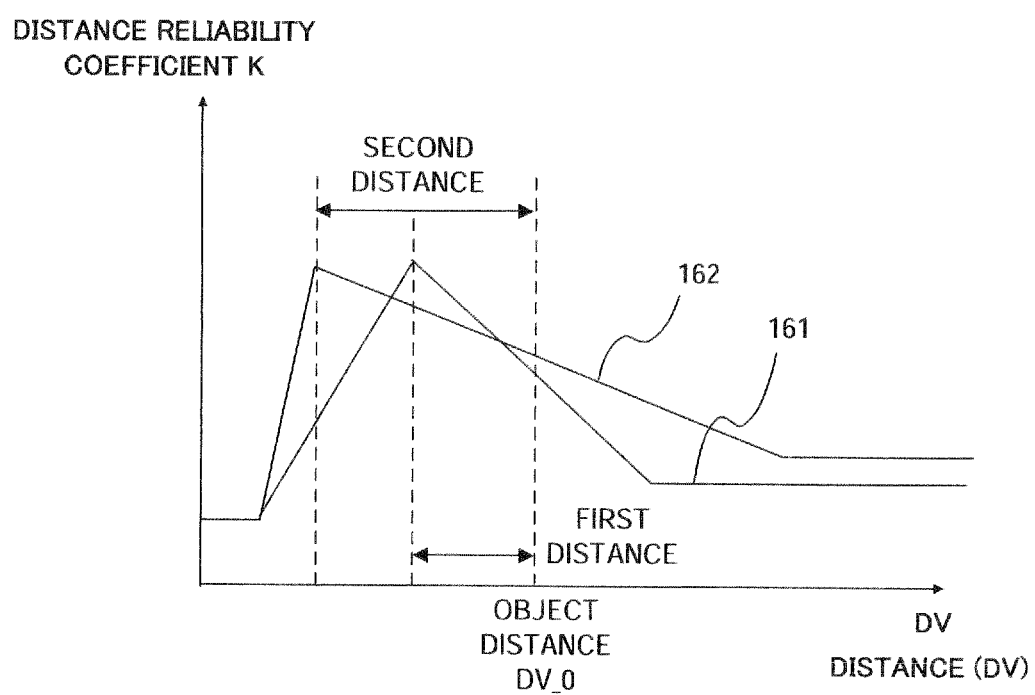
FIG. 16 is a view showing an example of a distance reliability coefficient calculation function for calculating the distance reliability coefficient K in a case where a main object exists.

Meanwhile, when it is determined in the step SD7 that a main object exists, the routine advances to the step SD9. In the step SD9, the distance reliability coefficient K is calculated on the basis of distance reliability coefficient calculation functions shown in FIG. 16. In FIG. 16, the abscissa axis shows the light source distance and the ordinate axis shows the distance reliability coefficient K.

In the example shown in FIG. 16, two distance reliability coefficient calculation functions 161, 162 are set in accordance with whether stroboscope light is emitted or not. The functions 161, 162 are set in accordance with the main object distance determined in the processing of the flowchart shown in FIG. 3. More specifically, the distance reliability coefficient calculation function 161 for use during stroboscope light emission is set such that a position of a first predetermined distance is set as the peak value from the main object distance. Similarly, the distance reliability coefficient calculation function 162 for use during non-stroboscope light emission is set such that a position of a second predetermined distance is set as the peak value from the main object distance. The reason for this is that an object positioned on the periphery of the main object but closer to the photographer than the main object is likely to have identical light source conditions to the main object.

Further, during stroboscope light emission, the effect of the stroboscope light increases as the distance from the photographer decreases, leading to a reduction in the probability of the light source color or estimable light source color. Therefore, as shown in FIG. 16, different distance reliability coefficient calculation functions are set in accordance with stroboscope light emission and non-stroboscope light emission.

It should be noted that in the distance reliability coefficient calculation functions shown in FIG. 16, the distance reliability coefficient K is determined in accordance with the light source distance and the presence or absence of stroboscope light, regardless of the respective areas 81 to 89. However, different functions may be set for each area 81 to 89 in accordance with the light source characteristics, as in the distance reliability coefficient calculation functions shown in FIG. 15.

In the step SD9, a determination is made as to whether or not light emission from the stroboscope 15 was underway during image photography. The distance reliability coefficient K is then calculated on the basis of the determination result, the distance reliability coefficient calculation functions 161, 162 shown in FIG. 16, and the light source distance.

In the step SD 10, a chromaticity L_POINT (x, y) of the light source in the photographed image is calculated using a following Equation (1).

$$L\_POINT(x,y) = 1/(\alpha 1 \times \alpha'1 \times K1 + \alpha 2 \times \alpha'2 \times K2 + \alpha 3 \times \alpha'3 \times K3 + \alpha 4 \times \alpha'4 \times K4 + \alpha 5 \times \alpha'5 \times K5 + \alpha 6 \times \alpha'6 \times K6 + \alpha 7 \times \alpha'7 \times K7 + \alpha 8 \times \alpha'8 \times K8 + \alpha 9 \times \alpha'9 \times K9 + m) \times \{\alpha 1 \times \alpha'1 \times K1 \times ZPOINT\_1(x,y) + \alpha 2 \times \alpha'2 \times K2 \times ZPOINT\_2(x,y) + \alpha 3 \times \alpha'3 \times K3 \times ZPOINT\_3(x,y) + \alpha 4 \times \alpha'4 \times K4 \times ZPOINT\_4(x,y) + \alpha 5 \times \alpha'5 \times K5 \times ZPOINT\_5(x,y) + \alpha 6 \times \alpha'6 \times K6 \times ZPOINT\_6(x,y) + \alpha 7 \times \alpha'7 \times K7 \times ZPOINT\_2def(x,y) + \alpha 8 \times \alpha'8 \times K8 \times ZPOINT\_3def(x,y) + \alpha 9 \times \alpha'9 \times K9 \times ZPOINT\_3\_def(x,y) + m \times ZPOINT\_3\_def(x,y)\}$$ (1)

In Equation (1), ZPOINT_2def (x, y) is a representative chromaticity of the light source color candidate area 82 corresponding to the cloudy sky light source and ZPOINT_3def (x, y) is a representative chromaticity of the light source color candidate area 83 corresponding to the clear sky, both of which are set in advance at appropriate values. The estimable light source color candidate areas 87 to 89 are color areas in which pale orange under a cloudy sky, pale orange under a clear sky, and green under a clear sky are respectively distributed. Hence, when a number of points positioned in the areas 87 to 89 is large, it is likely that pale orange under a cloudy sky, pale orange under a clear sky, and green under a clear sky exist on the photographed image plane, and therefore the light sources can be estimated as cloudy sky, clear sky, and clear sky, respectively. Hence, in Equation (1), the representative chromaticity ZPOINT_2def (x, y) of the light source color candidate area 82 corresponding to the cloudy sky light source is used as the chromaticity corresponding to the estimable light source color candidate area 87, and the representative chromaticity ZPOINT_3def (x, y) of the light source color candidate area 83 corresponding to the clear sky light source is used as the chromaticity corresponding to the estimable light source color candidate areas 88, 89.

Furthermore, in Equation (1), m is a predetermined value (a small value close to zero, for example), which serves as a coefficient used to increase a weight of the clear sky chromaticity relative to the chromaticity of the light source in a case where little light source color exists in the photographed image plane or a case where a light source exists but the first reliability coefficient, second reliability coefficient, and distance reliability coefficient are small such that the reliability of the light source is low. For example, when the number of detected light source colors is small, the likelihood that the object is illuminated by light from the light source is low in terms of luminance, and the object is far in terms of distance, the chromaticity et close to the chromaticity of clear sky, which is an innocuous and common light source. Further, when no light source colors exist in the photographed image plane, or in other words when a light source color estimation area is not detected, the chromaticity L_POINT (x, y) of the light source in the photographed image is set at the chromaticity of clear sky.

It should be noted that the equation used to calculate the chromaticity L_POINT (x, y) of the light source is not limited to Equation (1). For example, in Equation (1), the chromaticity of all areas 81 to 89 is used, but the chromaticity L_POINT (x, y) may be calculated using only a predetermined number of (three, for example) chromaticity values in which the value of first reliability coefficient×second reliability coefficient× distance reliability coefficient K is large.

In the step SD11, white balance adjustment is performed by calculating a white balance gain. Here, an inverse G/R, G/B of the light source chromaticity (R/G, B/G) calculated in the step SD10 is set as the white balance gain, whereupon the calculated white balance gain is multiplied by the R, B output values of all pixels. Through this processing, the light source color part becomes G=R=B, which is expressed as white.

In the step SD12, a color matrix is selected. Color matrices for each of the light source colors corresponding to the light source color candidate areas 81 to 86 are stored in advance in memory in accordance with the characteristics of the imaging device. The color matrix is used to determine correspondence between the light source chromaticity (R/G, B/G) calculated in the step SD10 and the light source colors corresponding to the respective light source color candidate areas 81 to 86 or determine the light source color to which the light source chromaticity (R/G, B/G) is closest, and to convert the color matrix of the determined light source color from R, G, B to Y, Cr, Cb, for example.

With the white balance adjustment apparatus according to the first embodiment described above, at least one light source color estimation area for estimating the light source color is estimated in the photographed image. Then, in relation to the estimated light source color estimation area, the depth direction distance of the photographed image is calculated as the distance of the light source color estimation area, the chromaticity of the light source color estimation area is calculated, and a white balance adjustment value is calculated on the basis of the distance and chromaticity of the light source color estimation area. Hence, even when a plurality of light sources exist in the photographed image, appropriate white balance adjustment values can be calculated in accordance with the plurality of light sources. Further, a white balance adjustment value can be calculated on the basis of the distance and chromaticity of the light source color estimation area even when an object that may easily be mistaken for a light source exists in the photographed image, and therefore an appropriate white balance adjustment value can be calculated without mistakenly recognizing an object that can easily be mistaken for a light source as the main light source.

In particular, with the white balance adjustment apparatus according to the first embodiment, a reliability indicating the probability of the estimated light source color estimation area is determined, and the white balance adjustment value is calculated on the basis of the distance, chromaticity, and reliability of the light source color estimation area, and therefore white balance adjustment can be performed even more appropriately. Furthermore, the reliability of the light source color estimation area is determined on the basis of information relating to the luminance during photography of the photographed image, and therefore the reliability of the light source color estimation area can be determined with a high degree of precision. The reliability of the light source color estimation area is also determined on the basis of the size of the light source color estimation area, and therefore the reliability of the light source color estimation area can be determined with a high degree of precision. The reliability of the light source color estimation area is also determined on the basis of the light source color estimation distance and the main object distance, and therefore the light source illuminating the object can be determined with a high degree of precision.

Further, the photographed image is divided into a plurality of areas, the depth direction distance of the photographed image is calculated for each divided area within the light source color estimation area, and the peak value of the distance at which the frequency of the calculated distance equals or exceeds the predetermined frequency threshold is calculated as the distance of the light source color estimation area. When a plurality of distance peak values equaling or exceeding the predetermined frequency threshold exists, the plurality of peak distance values are calculated as the distance of the light source color estimation area, and therefore the white balance adjustment value can be calculated with an even higher degree of precision using a larger amount of information. Further, when no distances having a frequency that equals or exceeds the predetermined frequency threshold exist, the most frequent distance of the distances having a smaller frequency than the predetermined frequency threshold is calculated as the distance of the light source color estimation area, and therefore light source color estimation areas having a smaller distance frequency than the predetermined frequency threshold are not excluded from the white balance adjustment value calculation.

Second Embodiment

Figure 17A:
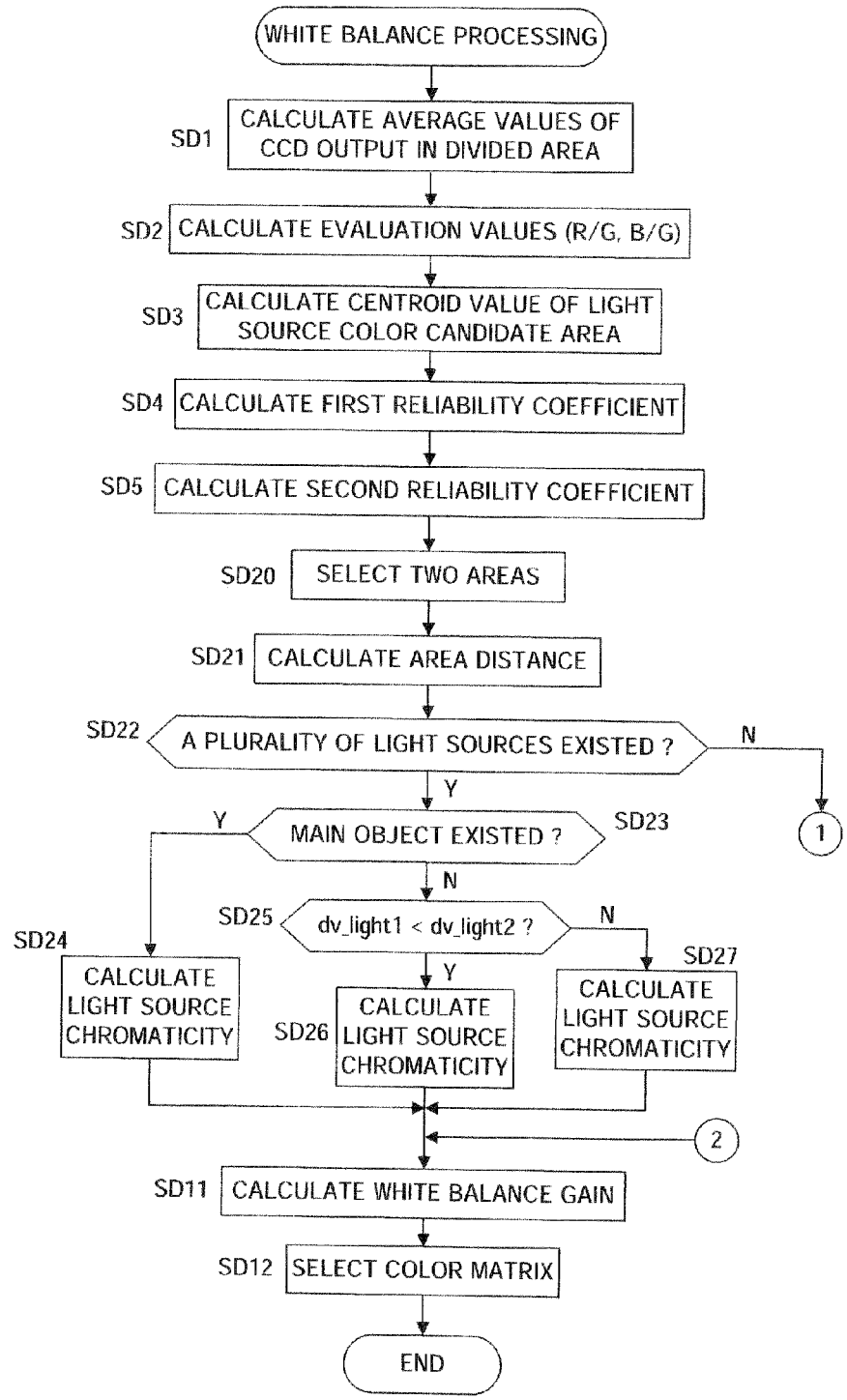
FIG. 17A is a flowchart showing in detail the content of white balance processing according to a second embodiment.
Figure 17B:
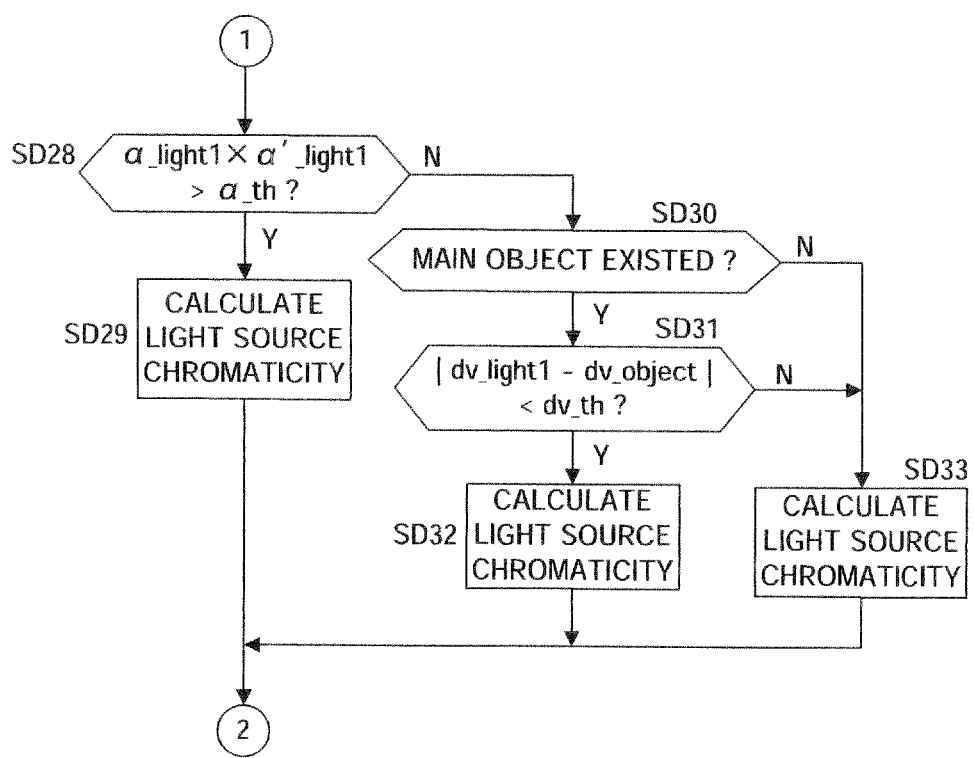
FIG. 17B is a flowchart showing in detail the content of white balance processing according to a second embodiment.

FIGS. 17A and 17B are flowcharts showing in detail the content of white balance processing according to a second embodiment, which is performed by the second image processing unit 27. In the flowcharts shown in FIGS. 17A and 17B, steps in which identical processing to the processing of the flowchart shown in FIG. 6 have been allocated identical step numbers, and detailed description thereof has been omitted.

In a step SD20 following the processing of the steps SD1 to SD5, two areas are selected from the light source color candidate areas 81 to 86 and the estimable light source color candidate areas 87 to 89 in descending order of a value obtained by multiplying the first reliability coefficient calculated in the step SD4 by the second reliability coefficient calculated in the step SD5. Here, the first reliability coefficients of the two selected areas are set respectively as $\alpha\_light1$, $\alpha\_light2$, the second reliability coefficients are set respectively as $\alpha'\_light1$, $\alpha'\_light2$, and the centroid values of the evaluation values in the areas are set respectively as ZPOINT_light1, ZPOINT_light2.

In the step SD3, only the centroid values of the light source color candidate areas 81 to 86 are determined, but as described above in the processing of the step SD10 in FIG. 6, the centroid values of the estimable light source color candidate areas 87 to 89 are set respectively as ZPOINT_2def (x, y), ZPOINT_3def (x, y), and ZPOINT_3def (x, y).

In a step SD21, the distance from the object to the image plane in each of the two areas selected in the step SD20 is calculated. Distance calculation is basically identical to the distance calculation performed in the step SD6 of FIG. 6 except that a comparison is not made with the predetermined frequency threshold Th when creating the distance histogram. In other words, the distance of a single peak value in the created distance histogram is set as the distance of the corresponding light source. Here, the distances determined in relation to the two areas selected in the step SD20 are set respectively as dv_light1, dv_light2.

In a step SD22, a determination is made as to whether or not a plurality of light sources exists, or in other words whether or not two light sources exist. When two light sources are selected in the step SD6, the routine advances to a step SD23. In the step SD23, a determination is made as to whether or not a main object exists. This determination is made on the basis of whether "present" or "absent" has been determined in relation to the main object in the processing of the flowchart shown in FIG. 3. When it is determined that a main object exists, the routine advances to a step SD24.

In the step SD24, the chromaticity L_POINT (x, y) of the light source in the photographed image is calculated using a following Equation (2). In Equation (2), dv_object is the main object distance determined in the processing of the flowchart shown in FIG. 3.

$$L\_POINT(x,y)=|dv\_light2-dv\_object|/|dv\_light1-dv\_light2|\times ZPOINT\_light1(x,y)+|dv\_light1-dv\_object|/|dv\_light1-dv\_light2|\times ZPOINT\_light2(x,y) \quad (2)$$

In Equation (2), a calculation is performed such that when the chromaticity values of the light sources corresponding to the two areas selected in the step SD20 are subjected to weighted addition, the weight is increased steadily as the light source is closer to the main object.

When it is determined in the step SD23 that a main object does not exist, on the other hand, the routine advances to a step SD25. In the step SD25, a determination is made as to whether or not dv_light1 is smaller than dv_light2. When it is determined that dv_light1 is smaller than dv_light2, the routine advances to a step SD26.

In the step SD26, the chromaticity L_POINT (x, y) of the light source in the photographed image is calculated using a following Equation (3).

$$L\_POINT(x,y)=\tfrac{2}{3}\times ZPOINT\_light1(x,y)+\tfrac{1}{3}\times ZPOINT\_light2(x,y) \quad (3)$$

As shown in Equation (3), when dv_light1 is smaller than dv_light2, a weighted calculation is performed such that the weight of the light source chromaticity corresponding to dv_light1 is larger than the weight of the light source chromaticity corresponding to dv_light2.

When it is determined in the step SD25 that dv_light1 is equal to or greater than dv_light2, on the other hand, the routine advances to a step SD27. In the step SD27, the chromaticity L_POINT (x, y) of the light source in the photographed image is calculated using a following Equation (4).

$$L\_POINT(x,y)=\tfrac{1}{3}\times ZPOINT\_light1(x,y)+\tfrac{2}{3}\times ZPOINT\_light2(x,y) \quad (4)$$

As shown in Equation (4), when dv_light1 is equal to or greater than dv_light2, a weighted calculation is performed such that the weight of the light source chromaticity corresponding to dv_light2 is larger than the weight of the light source chromaticity corresponding to dv_light1.

When only a single light source is detected in the step SD22, or in other words when, of the nine areas 81 to 89, eight areas in which the product of the first reliability coefficient and the second reliability coefficient is zero are detected in the processing of the step SD20 such that only one light source can be selected, the routine advances to a step SD28 in FIG. 17B. In the step SD28, a determination is made as to whether or not a relationship shown in a following Equation (5) is established. In Equation (5), α_th is a predetermined threshold for determining the reliability of the light source.

$$\alpha\_light1\times\alpha'\_light1>\alpha\_th \quad (5)$$

When it is determined that the relationship of Equation (5) is established, the routine advances to a step SD29. In the step SD29, it is determined that the reliability of the light source is high, and the chromaticity of the selected light source is set as is, i.e at the light source chromaticity L_POINT (x, y). In other words, the light source chromaticity L_POINT (x, y) is calculated using a following Equation (6). In Equation (6), ZPOINT_light1 (x, y) is the centroid value of the evaluation values in the single selected area.

$$L\_POINT(x,y)=ZPOINT\_light1(x,y) \quad (6)$$

When it is determined in the step SD28 that the relationship of Equation (5) is not established, on the other hand, the routine advances to a step SD30. In the step SD30, a determination is made as to whether or not a main object exists. When it is determined that a main object exists, the routine advances to a step SD31.

In the step SD31, a determination is made as to whether or not a relationship shown in a following Equation (7) is established, and when it is determined that the relationship is established, the routine advances to a step SD32. In Equation (7), dv_th is a predetermined distance threshold.

$$|dv\_light1-dv\_object|<dv\_th \quad (7)$$

In the step SD32, the light source chromaticity L_POINT (x, y) of the photographed image is calculated using a following Equation (8).

$$L\_POINT(x,y)=|dv\_light\_def-dv\_object|/|dv\_light1-dv\_light\_def|\times ZPOINT\_light1(x,y)+|dv\_light1-dv\_object|/|dv\_light1-dv\_light\_def|\times ZPOINT\_light\_def(x,y) \quad (8)$$

In Equation (8), ZPOINT_light_def (x, y) is the chromaticity of a predetermined light source, which in this embodiment is set at the chromaticity ZPOINT_3def (x, y) of clear sky. Further, dv_light_def is the light source distance of clear sky, for which a predetermined value is used.

When it is determined in the step SD30 that a main object does not exist and it is determined in the step SD31 that the relationship of Equation (7) is not established, the routine advances to a step SD33. In the step SD33, the chromaticity L_POINT (x, y) of the light source in the photographed image is calculated using a following Equation (9). In Equation (9), n (0<n<1) is a predetermined weighting coefficient.

$$L\_POINT(x,y)=n\times ZPOINT\_light1(x,y)+(1-n)\times ZPOINT\_light\_def(x,y) \quad (9)$$

Processing following determination of the light source chromaticity, or in other words the processing of the steps SD11 and SD12, is identical to the processing of the steps SD11 and SD12 in the flowchart shown in FIG. 6.

With the white balance adjustment apparatus according to the second embodiment described above, similarly to the white balance adjustment apparatus according to the first embodiment, an appropriate white balance adjustment value can be calculated even when a plurality of light sources exist in the photographed image or an object that is easily mistaken for a light source exists in the photographed image.

In the white balance adjustment apparatus according to the second embodiment, when only one light source color estimation area is estimated and the reliability of the estimated light source color estimation area is lower than a predetermined reliability, the white balance adjustment value is calculated on the basis of the chromaticity of the estimated light source color estimation area and the chromaticity of a predetermined light source. In so doing, a situation in which the white balance adjustment value is calculated on the basis of an unreliable light source chromaticity alone can be avoided.

Further, in the white balance adjustment apparatus according to the second embodiment, when two or more light source color estimation areas are estimated and a main object is determined to exist in the photographed image, the white balance adjustment value is calculated by applying weighting such that the light source color estimation areas are weighted steadily more heavily as the distance thereof to the main object decreases. In so doing, an appropriate white balance adjustment value prioritizing the chromaticity of the light source color estimation area that is closest to the main object can be calculated.

Furthermore, when two or more light source color estimation areas are estimated but a main object is determined not to exist in the photographed image, the white balance adjustment value is calculated by applying weighting such that the light source color estimation areas are weighted steadily more heavily as the distance thereof decreases. In so doing, a white balance adjustment value prioritizing the light source that is most likely to be illuminating the object can be calculated.

This invention is not limited to the embodiments described above, and may be subjected to various modifications and applications within a scope that does not depart from the spirit of the invention. An example of these modifications will be described below.

When the autofocus processing of the display sequence (see FIG. 2) is identical to the autofocus processing employed during still photography (see FIG. 4) but the autofocus processing is implemented frequently during display of the through-the-lens image signal on the display monitor 46, the visibility of the through-the-lens image deteriorates. Therefore, autofocus processing is performed when the face detection result varies (the determination result of the step SA8 is affirmative) and the object distance varies (the determination result of the step SA9 is affirmative), as described using FIG. 2. In this case, the precision of the object distance calculated using the result of the autofocus processing is lower than that obtained during still photography. In the embodiment described above, white balance processing employing distance information is performed similarly in both the display sequence and during still photography. However, processing described below in (i) and (ii) may be performed instead.

(i) In the display sequence, conventional white balance processing not employing distance information is performed.

(ii) The white balance processing described using FIG. 6 is performed only when accurate object distance information is obtained by an autofocus operation in the display sequence. In all other cases, conventional white balance processing is performed.

In the embodiments described above, the first reliability coefficient α, the second reliability coefficient α', and the distance reliability coefficient K are respectively calculated on the basis of the photography luminance, the number of evaluation values in an area, and the light source distance. However, these coefficients may be determined also taking into account the luminance of the light source color, a dispersion value of the light source color, a color difference relative to a black body radiation locus, and so on.

The distance of the light source color estimation area is a distance in the depth direction of the photographed image, and in the embodiments described above, the distance from the CCD 12 to the object of the light source color estimation area is set as the distance of the light source color estimation area. However, the distance from a main object on the photographed image plane to the object of the light source color estimation area, for example, may be used instead. This distance can be determined by measuring the distance between the main object on the photographed image plane and the object of the light source color estimation area on the photographed image plane, and converting the measured distance into an actual distance on the basis of a focal length of the imaging lens.

In the embodiments described above, the distance of the light source color estimation area is determined using a DFF method in which the distance of the light source color estimation area is determined from the focal point position during autofocus processing. However, a DFD method in which the distance is determined using a correlation model between a blur amount and the distance of the image may be used, or a distance measurement sensor may be provided separately such that the distance is measured using the sensor.

In the step SD20 of the flowchart shown in FIG. 17A, two areas are selected from the light source color candidate areas 81 to 86 and the estimable light source color candidate areas 87 to 89, but three or more areas may be selected. In this case, weighting may be applied in the step SD24 such that the chromaticity values of the respective selected areas are weighted steadily more heavily as the distance of the area to the main object decreases, whereupon the chromaticity L_POINT (x, y) of the light source in the photographed image is determined. Further, in the processing following a negative determination in the step SD23, weighting may be applied such that the chromaticity values of the respective selected areas are weighted steadily more heavily as the distance of the area decreases, whereupon the chromaticity L_POINT (x, y) of the light source in the photographed image is determined.

It should be noted that a computer may execute the processing described in the above embodiments. In this case, the computer includes a CPU, a main storage device such as a RAM, and a computer-readable storage medium storing a program for realizing all or a part of the processing described in each embodiment. Here, the program is referred to as a white balance adjustment program. By having the CPU read the white balance adjustment program stored on the storage medium and execute information processing/calculation processing, similar processing to that of the white balance adjustment apparatus described above is realized.

Here, a computer-readable storage medium denotes a magnetic disk, a magneto-optical disk, a CD-ROM, a DVD-ROM, a semiconductor memory, and so on. Further, the white balance adjustment program may be distributed to a computer by a communication line, whereupon the computer executes the received distributed white balance adjustment program.

This application claims priority based on JP2008-304302, filed with the Japan Patent Office on Nov. 28, 2008, the entire contents of which are incorporated into this specification by reference.

What is claimed is:

1. A white balance adjustment apparatus comprising:
   an area estimation unit that specifies a plurality of light source color estimation areas for estimating a light source color in a photographed image;
   a distance calculation unit that calculates distances of the specified light source color estimation areas and respective frequencies of the distances for each of the light source color estimation areas, in a depth direction of the photographed image;
   a chromaticity calculation unit that calculates a chromaticity of a light source in the photographed image based on the distances of the light source color estimation areas, the frequencies of the distances, and chromaticities corresponding to the light source color estimation areas; and
   a white balance adjustment value calculation unit that calculates a white balance adjustment value based on the chromaticity of the light source in the photographed image.

2. The white balance adjustment apparatus as defined in claim 1, further comprising a reliability determination unit that determines a reliability indicating a probability of each of the specified light source color estimation areas,
   wherein the chromaticity calculation unit calculates the chromaticity of the light source in the photographed image based on the distances of the light source color estimation areas, the frequencies of the distances, the chromaticities of the light source color estimation areas, and the reliability of each of the light source color estimation areas.

3. The white balance adjustment apparatus as defined in claim 2, further comprising a luminance information acquisition unit that obtains object luminance information expressing a luminance of an object appearing on the photographed image,
wherein the reliability determination unit determines the reliability of each of the light source color estimation areas based on the object luminance information.

4. The white balance adjustment apparatus as defined in claim 2, wherein the chromaticity calculation unit applies weighting such that a chromaticity of a predetermined light source is weighted more heavily as the reliability of the light source color estimation areas decreases.

5. The white balance adjustment apparatus as defined in claim 1, wherein the chromaticity calculation unit calculates the chromaticity of the light source in the photographed image by applying weighting such that weights of the chromaticities of the light source color estimation areas increase as distances corresponding to the light source color estimation areas, which are determined based on the frequencies of the distances calculated by the distance calculation unit, decrease.

6. The white balance adjustment apparatus as defined in claim 5, wherein the chromaticity calculation unit determines weights based on functions for defining the weights in accordance with the distances which are determined based on the frequencies of the distances calculated by the distance calculation unit.

7. The white balance adjustment apparatus as defined in claim 6, wherein the functions for defining the weights in accordance with the distances are set in accordance with each of a plurality of light source types.

8. The white balance adjustment apparatus as defined in claim 7, further comprising a light source type determination unit that determines light source types of the light source color estimation areas based on color information relating to the light source color estimation areas.

9. The white balance adjustment apparatus as defined in claim 5, wherein the chromaticity calculation unit includes table data defining a relationship between the distances of the light source color estimation areas and the weights, and determines the weights based on the distances which are determined based on the frequencies of the distances calculated by the distance calculation unit and by referring to the table data.

10. The white balance adjustment apparatus as defined in claim 1, further comprising:
a main object estimation unit that estimates a main object of the photographed image; and
an object distance calculation unit that calculates a distance to the estimated main object in the depth direction of the photographed image,
wherein the chromaticity calculation unit determines a weight of each of the plurality of light source color estimation areas in accordance with a relationship between a distance of the light source color estimation area, which is determined based on the frequencies of the distances calculated by the distance calculation unit, and the distance to the main object, and weights the chromaticities of the light source color estimation areas in accordance with the determined weights.

11. The white balance adjustment apparatus as defined in claim 10, further comprising a stroboscope light emission detection unit that detects whether or not a stroboscope is emitting light during photography of the photographed image,
wherein the chromaticity calculation unit modifies the weights of the light source color estimation areas depending on whether or not the stroboscope emits light.

12. The white balance adjustment apparatus as defined in claim 1, wherein the white balance adjustment value calculation unit calculates the white balance adjustment value using a chromaticity of a predetermined light source when no light source color estimation areas can be specified.

13. The white balance adjustment apparatus as defined in claim 1, wherein the chromaticity calculation unit comprises:
a main object determination unit that determines whether or not a main object exists in the photographed image; and
an object distance calculation unit that calculates a distance to the main object in the depth direction of the photographed image when the main object is determined to exist, and
wherein when the main object is determined to exist, the chromaticity calculation unit calculates the chromaticity of the light source in the photographed image by applying weighting such that the chromaticities of the light source color estimation areas are weighted more heavily as the distance to the main object decreases.

14. The white balance adjustment apparatus as defined in claim 1, wherein the chromaticity calculation unit comprises a main object determination unit that determines whether or not a main object exists in the photographed image, and
wherein when the main object is determined not to exist, the chromaticity calculation unit calculates the chromaticity of the light source in the photographed image by applying weighting such that the chromaticities of the light source color estimation areas are weighted more heavily as distances of the light source color estimation areas, which are determined based on the frequencies of the distances calculated by the distance calculation unit, decrease.

15. A white balance adjustment apparatus comprising:
an area estimation unit that specifies a plurality of light source color estimation areas for estimating a light source color in a photographed image;
a distance calculation unit that calculates respective distances of the specified light source color estimation areas in a depth direction of the photographed image;
a chromaticity calculation unit that calculates a chromaticity of a light source in the photographed image based on the distances of the light source color estimation areas and chromaticities corresponding to the light source color estimation areas;
a white balance adjustment value calculation unit that calculates a white balance adjustment value based on the chromaticity of the light source in the photographed image;
a reliability determination unit that determines a reliability indicating a probability of each of the specified light source color estimation areas, wherein the chromaticity calculation unit calculates the chromaticity of the light source in the photographed image based on the distances of the light source color estimation areas, the chromaticities of the light source color estimation areas, and the reliability of each of the light source color estimation area; and
a light source color estimation area size calculation unit that calculates a size of each of the specified light source color estimation areas, wherein the reliability determination unit determines the reliability of each of the light source color estimation areas based on the respective sizes of the light source color estimation areas.

16. A white balance adjustment apparatus comprising:
an area estimation unit that specifies a plurality of light source color estimation areas for estimating a light source color in a photographed image;
a distance calculation unit that calculates respective distances of the specified light source color estimation areas in a depth direction of the photographed image;
a chromaticity calculation unit that calculates a chromaticity of a light source in the photographed image based on the distances of the light source color estimation areas and chromaticities corresponding to the light source color estimation areas;
a white balance adjustment value calculation unit that calculates a white balance adjustment value based on the chromaticity of the light source in the photographed image; and
an area division unit that divides the photographed image into a plurality of areas,
wherein the distance calculation unit calculates a distance of each divided area of the light source color estimation areas in the depth direction of the photographed image, and, for each of the light source color estimation areas, calculates a peak distance value at which a frequency of a calculated distance equals or exceeds a predetermined frequency threshold as the distance of the light source color estimation area.

17. The white balance adjustment apparatus as defined in claim 16, wherein, when a plurality of peak distance values at which frequencies of calculated distances equal or exceed the predetermined frequency threshold exist, the distance calculation unit calculates the plurality of peak distance values as the distance of the light source color estimation area.

18. The white balance adjustment apparatus as defined in claim 16, wherein, when a distance at which the frequency of a calculated distance equals or exceeds the predetermined frequency threshold does not exist, the distance calculation unit calculates a most frequent distance among the distances having frequencies that do not equal or exceed the predetermined frequency threshold as the distance of the light source color estimation area.

19. A white balance adjustment apparatus comprising:
an area estimation unit that estimates at least one light source color estimation area for estimating a light source color in a photographed image;
a distance calculation unit that calculates a distance of the light source color estimation area in a depth direction of the photographed image;
a chromaticity calculation unit that calculates a chromaticity of the light source color estimation area;
a white balance adjustment value calculation unit that calculates a white balance adjustment value based on the distance of the light source color estimation area and the chromaticity of the light source color estimation area;
a reliability determination unit that determines a reliability indicating a probability of the estimated light source color estimation area;
wherein the white balance adjustment value calculation unit calculates the white balance adjustment value based on the distance of the light source color estimation area, the chromaticity of the light source color estimation area, and the reliability of the light source color estimation area; and
wherein, when only one light source color estimation area is estimated and the reliability of the estimated light source color estimation area is lower than a predetermined reliability, the white balance adjustment value calculation unit calculates the white balance adjustment value based on the chromaticity of the estimated light source color estimation area and a chromaticity of a predetermined light source.

20. An imaging apparatus having the white balance adjustment apparatus as defined in claim 1.

21. A white balance adjustment method comprising:
specifying, using a processor, a plurality of light source color estimation areas for estimating a light source color in a photographed image;
calculating, using the processor, distances of the specified light source color estimation areas and respective frequencies of the distances for each of the light source color estimation areas, in a depth direction of the photographed image;
calculating, using the processor, a chromaticity of a light source in the photographed image based on the distances of the light source color estimation areas, the frequencies of the distances, and chromaticities corresponding to the light source color estimation areas; and
calculating, using the processor, a white balance adjustment value based on the chromaticity of the light source in the photographed image.

22. A storage device storing a white balance adjustment program, wherein the white balance adjustment program causes a computer to perform functions comprising:
specifying a plurality of light source color estimation areas for estimating a light source color in a photographed image;
calculating distances of the specified light source color estimation areas and respective frequencies of the distances for each of the light source color estimation areas, in a depth direction of the photographed image;
calculating a chromaticity of a light source in the photographed image based on the distances of the light source color estimation areas, the frequencies of the distances, and chromaticities of the light source color estimation areas; and
calculating a white balance adjustment value based on the chromaticity of the light source in the photographed image.

* * * * *